United States Patent
Berger et al.

(10) Patent No.: US 10,616,546 B2
(45) Date of Patent: Apr. 7, 2020

(54) COMMERCIALS ON MOBILE DEVICES

(71) Applicant: Penthera Partners, Inc, Pittsburgh, PA (US)

(72) Inventors: Adam L. Berger, Pittsburgh, PA (US); Joshua Pressnell, Dayton, OH (US); Richard David Jackson, Curitiba (BR)

(73) Assignee: Penthera Partners, Inc., New York, NY (US)

( * ) Notice: Subject to any disclaimer, the term of this patent is extended or adjusted under 35 U.S.C. 154(b) by 0 days.

(21) Appl. No.: 15/963,954

(22) Filed: Apr. 26, 2018

(65) Prior Publication Data
US 2018/0241981 A1    Aug. 23, 2018

Related U.S. Application Data

(63) Continuation of application No. 15/457,351, filed on Mar. 13, 2017, now Pat. No. 10,104,357, which is a (Continued)

(51) Int. Cl.
*H04N 9/80* (2006.01)
*H04N 9/82* (2006.01)
(Continued)

(52) U.S. Cl.
CPC ....... *H04N 9/8205* (2013.01); *G06Q 30/0261* (2013.01); *G06Q 30/0264* (2013.01);
(Continued)

(58) Field of Classification Search
CPC .......... G06Q 30/0261; G06Q 30/0267; G06Q 30/0264; G06Q 30/0269; G11B 27/10;
(Continued)

(56) References Cited

U.S. PATENT DOCUMENTS 5,850,518 A    12/1998   Northrup
5,893,077 A     4/1999   Griffin
(Continued)

FOREIGN PATENT DOCUMENTS

WO    WO 2014/193813    12/2014
WO    WO 2015/034750     3/2015
(Continued)

OTHER PUBLICATIONS

Digital Video Ad Serving Template (VAST) 3.0, "iab.com", retrieved from the internet on htt12://i\vwwiab.netivast, Oct. 4, 2013 (3 pages).
(Continued)

*Primary Examiner* — Robert Chevalier
(74) *Attorney, Agent, or Firm* — Fish & Richardson P.C.

(57) ABSTRACT

Among other things, videos and commercials are downloaded to a mobile device for storage on the mobile device and later playout on the mobile device. The downloading includes downloading of metadata associated with the commercials and based on which the mobile device can select commercials for insertion into videos being played back to the user of the mobile device. The commercials to be downloaded are selected based on one or a combination of any two or more of the location of the user, the type of mobile device, and personally-identifiable information about a user of the mobile device.

31 Claims, 15 Drawing Sheets

Figure 1:
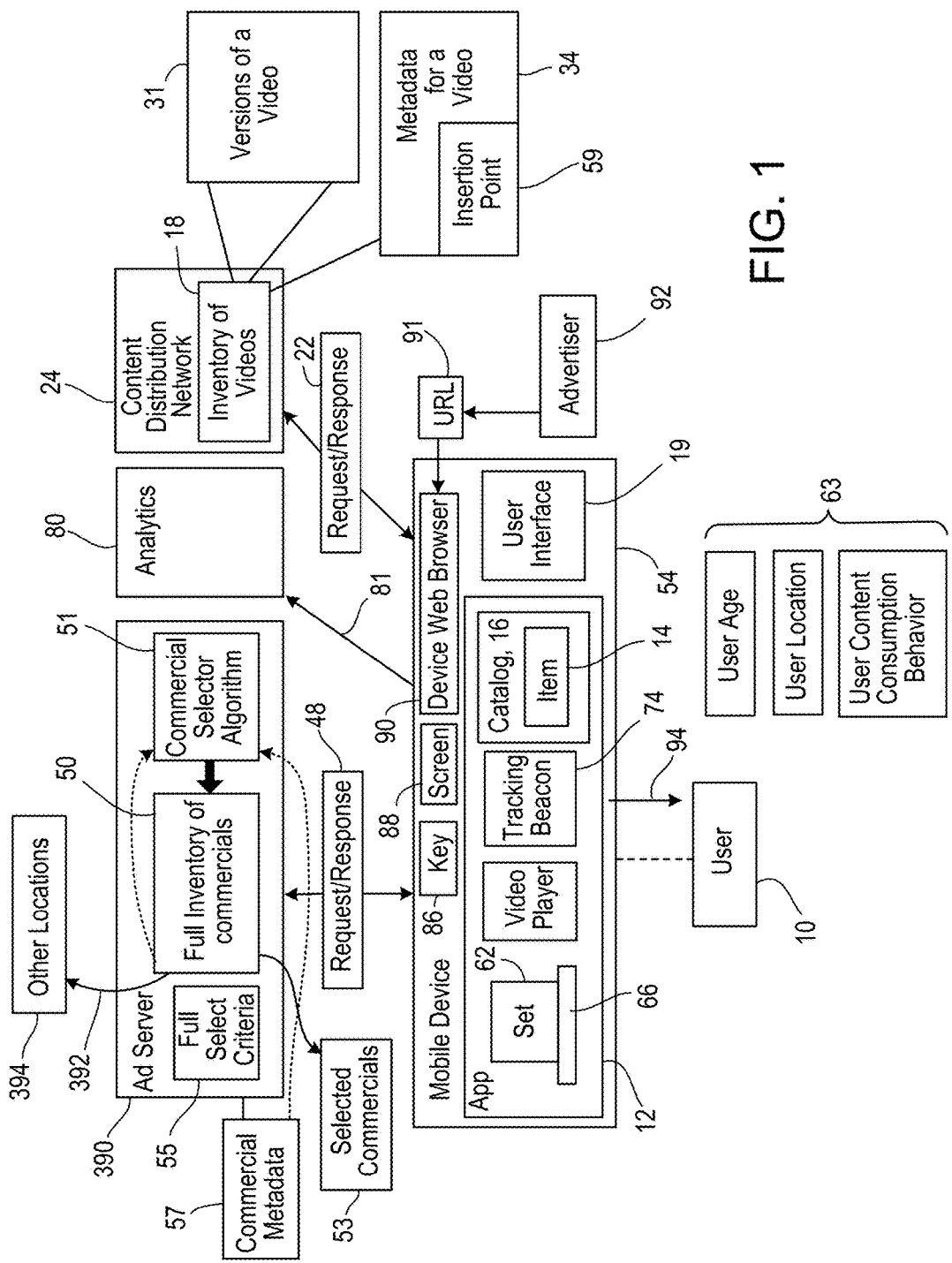

Related U.S. Application Data continuation of application No. 14/504,360, filed on Oct. 1, 2014, now Pat. No. 9,621,840, which is a continuation of application No. 14/243,937, filed on Apr. 3, 2014, now Pat. No. 8,929,717, and a continuation of application No. 14/243,971, filed on Apr. 3, 2014, now Pat. No. 8,923,683, which is a continuation of application No. 14/016,963, filed on Sep. 3, 2013, now Pat. No. 8,718,445, and a continuation of application No. 14/016,963, filed on Sep. 3, 2013, now Pat. No. 8,718,445.

(51) Int. Cl.
| | | |
|---|---|---|
| *H04N 5/76* | (2006.01) | |
| *H04N 5/92* | (2006.01) | |
| *H04N 5/93* | (2006.01) | |
| *G06Q 30/02* | (2012.01) | |
| *G11B 27/10* | (2006.01) | |

(52) U.S. Cl.
CPC ..... *G06Q 30/0267* (2013.01); *G06Q 30/0269* (2013.01); *G11B 27/10* (2013.01); *H04N 5/76* (2013.01); *H04N 5/92* (2013.01); *H04N 5/93* (2013.01)

(58) Field of Classification Search
CPC .. H04N 5/92; H04N 5/93; H04N 5/76; H04N 9/8205
USPC .......... 386/248, 249, 250, 251, 296
See application file for complete search history.

(56) References Cited

U.S. PATENT DOCUMENTS

| | | | |
|---|---|---|---|
| 6,138,147 | A | 10/2000 | Weaver |
| 6,611,813 | B1 | 8/2003 | Bratton |
| 6,993,245 | B1 | 1/2006 | Harville |
| 7,164,368 | B1 | 1/2007 | Ireland |
| 7,191,332 | B1 | 3/2007 | Pankajakshan |
| 7,689,541 | B1 | 3/2010 | Le Grand |
| 7,725,494 | B2 | 5/2010 | Rogers |
| 7,966,218 | B1 | 6/2011 | Fish |
| 8,015,253 | B1 | 9/2011 | Zapata et al. |
| 8,060,407 | B1 | 11/2011 | Delker et al. |
| 8,099,511 | B1 | 1/2012 | Ganesan et al. |
| 8,122,102 | B2 | 2/2012 | Wein |
| 8,195,029 | B2 | 6/2012 | Fujiwara et al. |
| 8,208,788 | B2 | 6/2012 | Ando et al. |
| 8,233,879 | B1 | 7/2012 | Lee |
| 8,413,151 | B1 | 4/2013 | Stratton et al. |
| 8,489,731 | B2 | 7/2013 | Gagliardi |
| 8,510,661 | B2 | 8/2013 | Dharmaji |
| 8,539,523 | B2 | 9/2013 | Philpott et al. |
| 8,606,637 | B1 | 12/2013 | Delker et al. |
| 8,631,436 | B2 | 1/2014 | Arrasvuori |
| 8,701,145 | B1 | 4/2014 | Berger et al. |
| 8,718,445 | B1 | 5/2014 | Berger et al. |
| 8,788,695 | B2 | 7/2014 | Fox |
| 8,838,748 | B2 | 9/2014 | Nair |
| 8,923,683 | B1 | 12/2014 | Berger et al. |
| 8,929,717 | B1 | 1/2015 | Berger et al. |
| 8,959,244 | B2 | 2/2015 | Lin et al. |
| 8,978,086 | B2 | 3/2015 | Bhatia |
| 9,066,115 | B1 | 6/2015 | Cherry |
| 9,066,138 | B1 | 6/2015 | Kraiman |
| 9,244,916 | B2 | 1/2016 | Berger et al. |
| 9,621,840 | B2 | 4/2017 | Berger et al. |
| 10,104,357 | B2 | 10/2018 | Berger et al. |
| 2001/0009855 | A1 | 7/2001 | L'Anson |
| 2001/0031066 | A1 | 10/2001 | Meyer |
| 2001/0051998 | A1 | 12/2001 | Henderson |
| 2001/0052019 | A1 | 12/2001 | Walters |
| 2002/0053090 | A1 | 5/2002 | Okayama |
| 2002/0056123 | A1 | 5/2002 | Liwerant |
| 2002/0060747 | A1 | 5/2002 | Nonomura |
| 2002/0083443 | A1 | 6/2002 | Eldering et al. |
| 2002/0103822 | A1 | 8/2002 | Miller |
| 2002/0133491 | A1 | 9/2002 | Sim et al. |
| 2002/0143629 | A1 | 10/2002 | Mineyama et al. |
| 2002/0169926 | A1 | 11/2002 | Pinckney |
| 2003/0033325 | A1 | 2/2003 | Boogard |
| 2003/0110416 | A1 | 6/2003 | Morrison et al. |
| 2003/0154128 | A1 | 8/2003 | Liga |
| 2004/0039834 | A1 | 2/2004 | Saunders |
| 2004/0260930 | A1 | 12/2004 | Malik |
| 2005/0198097 | A1 | 9/2005 | Kalnitsky |
| 2005/0287971 | A1 | 12/2005 | Christensen |
| 2006/0031407 | A1 | 2/2006 | Dispensa et al. |
| 2006/0041840 | A1 | 2/2006 | Blair et al. |
| 2006/0160543 | A1 | 7/2006 | Mashinsky |
| 2006/0181982 | A1 | 8/2006 | Villevieille et al. |
| 2006/0199548 | A1 | 9/2006 | Saraby |
| 2006/0206889 | A1 | 9/2006 | Ganesan et al. |
| 2007/0005795 | A1 | 1/2007 | Gonzalez |
| 2007/0025363 | A1 | 2/2007 | Zhang |
| 2007/0113243 | A1 | 5/2007 | Brey |
| 2007/0162571 | A1 | 7/2007 | Gupta et al. |
| 2007/0174774 | A1 | 7/2007 | Lerman et al. |
| 2007/0180118 | A1 | 8/2007 | Kim et al. |
| 2007/0204057 | A1 | 8/2007 | Shaver et al. |
| 2007/0207755 | A1 | 9/2007 | Julia |
| 2007/0226810 | A1 | 9/2007 | Hotti |
| 2007/0294422 | A1 | 12/2007 | Zuckerman et al. |
| 2007/0294772 | A1 | 12/2007 | Hydrie et al. |
| 2007/0300263 | A1 | 12/2007 | Barton et al. |
| 2008/0010117 | A1* | 1/2008 | Oliveira .......... G06Q 30/02 705/26.1 |
| 2008/0010133 | A1 | 1/2008 | Pyhalammi et al. |
| 2008/0010372 | A1 | 1/2008 | Khedouri |
| 2008/0032739 | A1 | 2/2008 | Hoodbhoy et al. |
| 2008/0060000 | A1 | 3/2008 | Drouet et al. |
| 2008/0091796 | A1 | 4/2008 | Story et al. |
| 2008/0098301 | A1 | 4/2008 | Black et al. |
| 2008/0098420 | A1 | 4/2008 | Khivesara et al. |
| 2008/0114861 | A1 | 5/2008 | Gildred |
| 2008/0201751 | A1 | 8/2008 | Ahmed |
| 2008/0207200 | A1 | 8/2008 | Fein et al. |
| 2008/0255943 | A1 | 10/2008 | Morten et al. |
| 2008/0263581 | A1 | 10/2008 | Turner |
| 2008/0281448 | A1 | 11/2008 | Uhrig |
| 2008/0289006 | A1 | 11/2008 | Hock et al. |
| 2009/0001173 | A1 | 1/2009 | Sevier et al. |
| 2009/0006642 | A1 | 1/2009 | Dickens |
| 2009/0019468 | A1 | 1/2009 | Ganesan et al. |
| 2009/0025048 | A1 | 1/2009 | Ganesan |
| 2009/0030926 | A1 | 1/2009 | Aharoni |
| 2009/0037515 | A1 | 2/2009 | Zapata et al. |
| 2009/0048914 | A1 | 2/2009 | Shenfield et al. |
| 2009/0055547 | A1 | 2/2009 | Hudson |
| 2009/0061925 | A1 | 3/2009 | Finkelstein et al. |
| 2009/0070841 | A1 | 3/2009 | Buga et al. |
| 2009/0074051 | A1 | 3/2009 | Manapragada et al. |
| 2009/0094113 | A1 | 4/2009 | Berry et al. |
| 2009/0097826 | A1 | 4/2009 | Kim et al. |
| 2009/0119730 | A1 | 5/2009 | Perlman et al. |
| 2009/0150558 | A1 | 6/2009 | Lee et al. |
| 2009/0185788 | A1 | 7/2009 | Lee et al. |
| 2009/0222851 | A1 | 9/2009 | Talmi |
| 2009/0254966 | A1 | 10/2009 | Josephs et al. |
| 2009/0274447 | A1 | 11/2009 | Morinaga et al. |
| 2009/0287841 | A1 | 11/2009 | Chapweske |
| 2009/0303231 | A1 | 12/2009 | Robinet et al. |
| 2009/0319375 | A1 | 12/2009 | Dharmaji |
| 2009/0327976 | A1 | 12/2009 | Williamson et al. |
| 2010/0057576 | A1 | 3/2010 | Brodersen et al. |
| 2010/0095012 | A1 | 4/2010 | Zuckerman |
| 2010/0111500 | A1 | 5/2010 | Kuroda |
| 2010/0115060 | A1 | 5/2010 | Julia et al. |
| 2010/0125628 | A1 | 5/2010 | Huysegems et al. |
| 2010/0185854 | A1 | 7/2010 | Burns et al. |
| 2010/0198982 | A1 | 8/2010 | Fernandez |

(56) References Cited

U.S. PATENT DOCUMENTS

| | | |
|---|---|---|
| 2010/0211431 A1* | 8/2010 | Lutnick ................ G06Q 30/02 705/14.12 |
| 2010/0222046 A1 | 9/2010 | Cumming |
| 2010/0228591 A1* | 9/2010 | Therani ................ G06Q 30/00 705/14.54 |
| 2010/0235762 A1 | 9/2010 | Laiho |
| 2010/0269138 A1 | 10/2010 | Krikorian et al. |
| 2010/0273553 A1 | 10/2010 | Zalewski |
| 2010/0274664 A1 | 10/2010 | Fernandez |
| 2010/0287580 A1 | 11/2010 | Harding et al. |
| 2010/0306402 A1 | 12/2010 | Russell et al. |
| 2011/0066703 A1 | 3/2011 | Kaplan |
| 2011/0066749 A1 | 3/2011 | Alstrup et al. |
| 2011/0066768 A1 | 3/2011 | Brittner et al. |
| 2011/0087603 A1 | 4/2011 | Garcia et al. |
| 2011/0087794 A1 | 4/2011 | Li et al. |
| 2011/0191812 A1 | 8/2011 | Cory et al. |
| 2011/0219402 A1 | 9/2011 | Candelore et al. |
| 2011/0246661 A1 | 10/2011 | Manzari et al. |
| 2011/0252118 A1 | 10/2011 | Pantos et al. |
| 2011/0264732 A1 | 10/2011 | Robbin et al. |
| 2011/0276621 A1 | 11/2011 | Edery et al. |
| 2011/0276993 A1 | 11/2011 | Ferguson |
| 2011/0295980 A1 | 12/2011 | Aldis et al. |
| 2011/0296048 A1 | 12/2011 | Knox |
| 2011/0306386 A1 | 12/2011 | Centoza et al. |
| 2012/0005313 A1 | 1/2012 | McGowan |
| 2012/0005365 A1 | 1/2012 | Ma et al. |
| 2012/0023251 A1 | 1/2012 | Pyle et al. |
| 2012/0054818 A1 | 3/2012 | Noh et al. |
| 2012/0079605 A1 | 3/2012 | Bolin et al. |
| 2012/0086552 A1 | 4/2012 | Fast et al. |
| 2012/0143994 A1 | 6/2012 | Calcev et al. |
| 2012/0150992 A1 | 6/2012 | Mays |
| 2012/0158515 A1* | 6/2012 | K. ................... G06O 30/0269 705/14.66 |
| 2012/0167132 A1 | 6/2012 | Mathews |
| 2012/0169608 A1 | 7/2012 | Forutanpour et al. |
| 2012/0170906 A1 | 7/2012 | Soroushian et al. |
| 2012/0198041 A1 | 8/2012 | Black et al. |
| 2012/0198042 A1 | 8/2012 | Dunbar et al. |
| 2012/0198333 A1 | 8/2012 | Kramer et al. |
| 2012/0246279 A1 | 9/2012 | Zang |
| 2012/0254456 A1 | 10/2012 | Visharam et al. |
| 2012/0254565 A1 | 10/2012 | Mitra et al. |
| 2012/0265029 A1 | 10/2012 | Fahey |
| 2012/0278728 A1 | 11/2012 | Malin et al. |
| 2012/0278837 A1 | 11/2012 | Curtis et al. |
| 2012/0289147 A1 | 11/2012 | Raleigh et al. |
| 2012/0304233 A1 | 11/2012 | Roberts et al. |
| 2012/0331168 A1 | 12/2012 | Chen |
| 2013/0018899 A1 | 1/2013 | Hargreaves et al. |
| 2013/0054728 A1 | 2/2013 | Amir et al. |
| 2013/0054837 A1 | 2/2013 | Von Elgg et al. |
| 2013/0070093 A1 | 3/2013 | Rivera |
| 2013/0080267 A1 | 3/2013 | McGowan |
| 2013/0080579 A1 | 3/2013 | Gordon |
| 2013/0080772 A1 | 3/2013 | McGowan |
| 2013/0099920 A1 | 4/2013 | Song et al. |
| 2013/0100944 A1 | 4/2013 | Kwon et al. |
| 2013/0142055 A1 | 6/2013 | Bao et al. |
| 2013/0165208 A1 | 6/2013 | Nelson et al. |
| 2013/0174272 A1 | 7/2013 | Chevalier et al. |
| 2013/0179913 A1 | 7/2013 | Haberman et al. |
| 2013/0185488 A1 | 7/2013 | Talagala et al. |
| 2013/0219426 A1 | 8/2013 | Zweig et al. |
| 2013/0227080 A1 | 8/2013 | Gao et al. |
| 2013/0232198 A1 | 9/2013 | Tenbrock |
| 2013/0232232 A1 | 9/2013 | Reza |
| 2013/0238740 A1 | 9/2013 | Vass et al. |
| 2013/0246643 A1 | 9/2013 | Luby et al. |
| 2013/0283393 A1 | 10/2013 | Hierro et al. |
| 2013/0297466 A1 | 11/2013 | Rossato et al. |
| 2013/0308699 A1 | 11/2013 | Musser |
| 2013/0311775 A1 | 11/2013 | Nair et al. |
| 2013/0336320 A1 | 12/2013 | Rangaraman |
| 2014/0012949 A1 | 1/2014 | Meyers et al. |
| 2014/0059244 A1 | 2/2014 | Panje et al. |
| 2014/0068684 A1 | 3/2014 | Mehta et al. |
| 2014/0089993 A1 | 3/2014 | Huysegerns |
| 2014/0095667 A1 | 4/2014 | Quan et al. |
| 2014/0108495 A1 | 4/2014 | Benno |
| 2014/0129676 A1 | 5/2014 | Zeng et al. |
| 2014/0165118 A1 | 6/2014 | Garcia |
| 2014/0198641 A1 | 7/2014 | Perkuhn et al. |
| 2014/0201334 A1 | 7/2014 | Wang et al. |
| 2014/0215536 A1 | 7/2014 | Maxwell et al. |
| 2014/0223503 A1 | 8/2014 | Govande et al. |
| 2014/0245359 A1 | 8/2014 | De Foy et al. |
| 2014/0279852 A1 | 9/2014 | Chen |
| 2014/0280990 A1 | 9/2014 | Dove et al. |
| 2014/0281010 A1 | 9/2014 | Panje et al. |
| 2014/0344034 A1* | 11/2014 | Goodman .......... G06Q 30/0209 705/14.12 |
| 2014/0355955 A1 | 12/2014 | Berger et al. |
| 2014/0359081 A1 | 12/2014 | Van Deventer |
| 2014/0365677 A1 | 12/2014 | Mueller et al. |
| 2015/0046470 A1 | 2/2015 | Koo et al. |
| 2015/0063783 A1 | 3/2015 | Berger et al. |
| 2015/0074709 A1 | 3/2015 | Berger et al. |
| 2015/0074715 A1 | 3/2015 | Berger et al. |
| 2015/0095460 A1 | 4/2015 | Berger et al. |
| 2015/0180873 A1 | 6/2015 | Mooij |
| 2015/0207841 A1 | 7/2015 | Drang |
| 2015/0215359 A1 | 7/2015 | Bao et al. |
| 2015/0281751 A1 | 10/2015 | Nemiroff |
| 2015/0288733 A1 | 10/2015 | Mao |
| 2015/0296274 A1 | 10/2015 | Good |
| 2015/0325268 A1 | 11/2015 | Berger et al. |
| 2015/0350703 A1 | 12/2015 | Rynderman et al. |
| 2015/0356612 A1 | 12/2015 | Mays et al. |
| 2015/0365450 A1 | 12/2015 | Gaunt et al. |
| 2015/0373075 A1 | 12/2015 | Perlman et al. |
| 2016/0028845 A1 | 1/2016 | Barr et al. |
| 2016/0057189 A1 | 2/2016 | Mosko et al. |
| 2016/0057465 A1 | 2/2016 | Jones |
| 2016/0165309 A1 | 6/2016 | Van Brandenburg et al. |
| 2016/0323348 A1 | 11/2016 | Bradbury et al. |
| 2017/0155912 A1 | 6/2017 | Thomas et al. |
| 2017/0188001 A1 | 6/2017 | Berger et al. |

FOREIGN PATENT DOCUMENTS

| | | |
|---|---|---|
| WO | WO 2015/038359 | 3/2015 |
| WO | WO2015/050651 | 4/2015 |
| WO | WO 2015/175367 | 11/2015 |

OTHER PUBLICATIONS

Gibbs, Cohn, "GoldSpot Delivers Mobile Ads While You Sleep", Mar. 5, 2010 (4 pages).

Powerpoint, "XfinitylM TV Player app", PowerPoint Presentation, Oct. 4, 2013 (7 pages).

VAST, "Digital Video Ad Serving Template (VAST) 3.0", http://w\\iw.iab.net/vast, retrieved from the Internet on Sep. 3, 2013 (3 pages).

U.S. Appl. No. 15/963,954, filed Apr. 16, 2018—published 20180241981.

U.S. Appl. No. 15/457,351, filed Mar. 13, 2017—issued U.S. Pat. No. 10,104,357.

U.S. Appl. No. 14/504,360, filed Oct. 1, 2016—issued U.S. Pat. No. 9,621,840.

U.S. Appl. No. 14/243,971, filed Apr. 13, 2014—issued U.S. Pat. No. 8,923,683.

U.S. Appl. No. 14/243,937, filed Apr. 3, 2014—issued U.S. Pat. No. 8,929,717.

Complete application as filed for U.S. Appl. No. 13/923,103, filed Jun. 20, 2013.

Complete application as filed for U.S. Appl. No. 14/025,797, filed Sep. 12, 2013.

U.S. Appl. No. 14/016,963, filed Sep. 3, 2013 and allowed claims.

(56) References Cited

OTHER PUBLICATIONS

Pending claims for U.S. Appl. No. 14/524,673.
U.S. Appl. No. 13/923,103.
U.S. Appl. No. 14/193,830.
U.S. Appl. No. 14/193,888.
U.S. Appl. No. 14/524,673.
U.S. Appl. No. 14/025,797.
Transaction history and allowed claims from U.S. Appl. No. 13/923,103 as of Oct. 1, 2014.
Transaction history and allowed claims from U.S. Appl. No. 14/193,830 as of Oct. 1, 2014.
Transaction history and allowed claims from U.S. Appl. No. 14/193,888 as of Oct. 1, 2014.
Transaction history and allowed claims from U.S. Appl. No. 14/243,937 as of Oct. 1, 2014.
Transaction history and allowed claims from U.S. Appl. No. 14/243,971 as of Oct. 1, 2014.
Transaction history and allowed claims from U.S. Appl. No. 14/275,710 as of Oct. 1, 2014.
U.S. Appl. No. 14/016,963, now U.S. Pat. No. 8,718,445.
Transaction history of U.S. Appl. No. 14/016,963 as of Apr. 2, 2014.
Transaction history, application and pending claims of U.S. Appl. No. 13/923,103.
Transaction history, application and pending claims of U.S. Appl. No. 14/193,830.
Transaction history, application and pending claims of U.S. Appl. No. 14/243,937.
Transaction history, application and pending claims of U.S. Appl. No. 14/275,710.
U.S. Appl. No. 14/016,963, filed Sep. 3, 2013—issued U.S. Pat. No. 8,718,445.
U.S. Appl. No. 14/982,894, filed Dec. 29, 2015—Published 20160234293.
U.S. Appl. No. 14/042,952, filed Oct. 1, 2013—Issued U.S. Pat. No. 9,244,916.
U.S. Appl. No. 14/524,673, filed Oct. 27, 2014—Published 20150325268.
U.S. Appl. No. 14/275,710, filed May 12, 2014—Abandoned.
Akhshabi et al., "An Experimental Evaluation of Rate-Adaption Algorithms in Adaptive Streaming over HTTP", MM System 2011 Proceedings of the Second Annual ACM Conference on Multimedia Systems, Feb. 2011, pp. 157-168.
Alumaula et al., "Cache & Carry: Predictive Content Caching in Intermittently Connected Mobile Devices", 2006.
Arya et al., "A Methodology for Selecting Experiments to Measure Energy Costs in Smartphones", 2011 7th International Wireless Communications and Mobile Computing Conference, Jul. 2011, 6 pages.
BrightCove.com [online], "Progressive Download versus Streaming", Mar. 31, 2009, [retrieved on Jul. 22, 2019], retrieved from: URL<https://www.brightcove.com/en/blog/2009/03/progressive-download-versus-streaming/>, 5 pages.
International Preliminary Report on Patentability issued in PCT application PCT/US2014/053196 dated Apr. 14, 2016 (7 pages).
Fielding et al., "Hypertext Transfer Protocol—HTTP/1.1", 1997, 163 pages.
Hofmann et al., "A Study of Network Performance with Application to Adaptive HTTP Streaming", Fraunhofer Institute for Integrated Circuits, 2011, 6 pages.
International Preliminary Report on Patentability from PCT/US2014/039534 dated Dec. 10, 2015 (7 pages).
International Preliminary Report on Patentability from PCT/US2014/053224 dated Mar. 17, 2016 (8 pages).
International Preliminary Report on Patentability from PCT/US2014/053410 dated Mar. 29, 2016 (9 pages).
International Preliminary Report on Patentability from PCT/US2015/030070 dated Nov. 23, 2016 (8 pages).
International Search Report and Written Opinion from corresponding PCT application No. PCT/US2014/053224 dated Nov. 24, 2014 (10 pages).
International Search Report and Written Opinion from corresponding PCT application No. PCT/US2014/053410 dated Jan. 21, 2015 (17 pages).
International Search Report and Written Opinion from corresponding PCT application No. PCT/US2015/030070 dated Aug. 7, 2015 (14 pages).
International Search Report and Written Opinion from PCT application PCT/US2014/053196 dated Feb. 9, 2015 (13 pages).
International search report and written opinion from PCT application PCT/US2014/39534 dated Oct. 10, 2014 (12 pages).
ISO/IEC, "Information Technology—JPEG 2000 Image Coding System—Part 12: ISO Base Media File Format", ISO/IEC, 2005, Second Edition, 15444-12.
ITU-T, "Information Technology—JPEG 2000 Image Coding System—Part 10: Extensions for Three-Dimensional Data", ISO/IEC 15444-10:200X, 2000.
Lazic et al., "One Implementation of Adaptive Streaming Over HTTP on Android DTV Platform", IEEE Second International Conference on Consumer Electronics, 2012, 3 pages.
Liu et al., "A Survey on peer-to-peer video streaming systems", Peer-to-Peer Networking and Applications, Mar. 2008, 1(1):18-28.
Marpe et al., "The H.264/MPEG4 Advanced Video Coding Standard and its Applications", IEEE Communications Magazine Standards Report, Aug. 2006, pp. 134-143.
Merriam-Webster, "Download", 2015.
Merriam-Webster, "Stream", 2015.
Merriam-Webster, "Streaming", 2015.
Michalos et al., "Dynamic Adaptive Streaming Over HTTP", Journal of Engineering Science and Technology Review, Sep. 2012, 5(2):30-34.
MythTV Wikipedia, "Commercial Detection", MythTV, retrieved from the Internet on Sep. 11, 2013 (2 pages).
Notice of Allowance from U.S. Appl. No. 14/275,710 dated Jul. 28, 2014 (11 pages).
OnlineVideo.com [online], "Streaming vs. Progressive Download vs. Adaptive Streaming", May 13, 2011, [retrieved on Jul. 22, 2019] retrieved from: URL<www.onlinevideo.net/2011/05/streaming-vs-progressive-download-vs-adaptive-streaming/>, 8 pages.
Application and pending claims for U.S. Appl. No. 13/923,103, filed Feb. 5, 2015.
Application and pending claims for U.S. Appl. No. 14/193,830, filed Feb. 5, 2015.
Application and pending claims for U.S. Appl. No. 14/193,888, filed Feb. 5, 2015.
Application and pending claims for U.S. Appl. No. 14/504,360, filed Feb. 5, 2015.
U.S. Appl. No. 14/042,952, filed Dec. 29, 2015.
Paul et al., "The Cache-and-Forward Network Architecture for Efficient Mobile Content Delivery Services in the Future Internet", 2008 First ITU-T Kaleidoscope Academic Conference Innovations in NGN: Future Network and Services, May 2008, 8 pages.
Romero, "A Dynamic Adaptive HTTP Streaming Video Service for Google Android", Master of Science Thesis: School of Information and Communication Technology, Oct. 6, 2011, 148 pages.
Schulzrinne et al., "Real Time Streaming Protocol (RTSP)", Network Working Group, Apr. 1998, 93 pages.
Schulzrinne, et al. "RFC 1889: RTP: A transport protocol for real-time applications." (1996): 25, 71 pages.
Sodagar, "MPEG-DASH: The Standard for Multimedia Streaming Over Internet", Communication Group, Apr. 2012.
Stockhammer, "Dynamic Adaptive Streaming over HTTP: Standards and Design Principles", ResearchGate Conference Paper, Jan. 2011, 4 pages.
Talukdar et al., "Streaming Video Capacities of LTE Air-Interface", 2010 IEEE International Conference on Communication, May 2010, 5 pages.
Webtvsolutions.com [online], Progressive vs. Streaming Download (VOD), Mar. 11, 2019, [retrieved on Jul. 22, 2019], retrieved from: URL<https://www.webtvsolutions.com/support.php?s=other_docs&d=streaming_progressive_vs_streaming&lang=en#>, 2 pages.
Wikipedia.com [online], "Progressive Download", Published on or before Aug. 7, 2019, [retrieved on Aug. 7, 2019], retrieved from: URL<wikipedia.com/>, 1 page.

(56) References Cited

OTHER PUBLICATIONS

Yates et al., "Postcards from the Edge: A Cache and Forward Architecture for the Future Internet", Wireless Information Network Laboratory, 2008, 18 pages.

Zannbelli, "IIS Smooth Streaming Technical Overview" Microsoft Silverlight, Mar. 2009, 17 pages.

* cited by examiner

POPULATE CACHE

INSPECT SAVED COMMERCIAL

PLAY DOWNLOADED VIDEO

COMMERCIALS ON MOBILE DEVICES

This application is a continuation application and claims priority under 35 U.S.C. § 120 to U.S. application Ser. No. 15/457,351, filed on Mar. 13, 2017, which a continuation and claims the benefit of U.S. application Ser. No. 14/504,360, filed on Oct. 1, 2014, now U.S. Pat. No. 9,621,840, issued on Apr. 11, 2017, which is a continuation application and claims the benefit of U.S. application Ser. No. 14/243,971, filed on Apr. 3, 2014, now U.S. Pat. No. 8,923,683, issued on Dec. 30, 2014 and to U.S. application Ser. No. 14/243,937, filed on Apr. 3, 2014, now U.S. Pat. No. 8,929,717, issued on Jan. 6, 2015, which are both continuation applications of and claim priority under U.S.C. § 120 from U.S. application Ser. No. 14/016,963, filed Sep. 3, 2013, now U.S. Pat. No. 8,718,445, issued on May 6, 2014, which is related to U.S. provisional patent application 61/828,481, filed on May 29, 2013, and to non-provisional patent application Ser. No. 13/923,103, filed on Jun. 20, 2013, the entire contents of all these applications are incorporated here by reference.

BACKGROUND

This description relates to commercials on mobile devices.

SUMMARY

In general, in an aspect, videos and commercials are downloaded to a mobile device for storage on the mobile device and later playout on the mobile device. The downloading includes downloading of metadata associated with the commercials and based on which the mobile device can select commercials for insertion into downloaded videos being played back to the user of the mobile device. The commercials to be downloaded are selected based on one or a combination of any two or more of the location of the user, the type of mobile device, and personally-identifiable information about a user of the mobile device.

Implementations may include one or a combination of any two or more of the following features. The location includes a location of the mobile device specified by GPS. The type of mobile device includes a make and/or model. The metadata associated with each of the commercials includes one of more of (a) a number of impressions allowed for, (b) an expiration date of, and (c) information about videos into which insertion is permitted for each of the commercials. The downloading includes downloading of metadata associated with the videos and based on which the mobile device can detect in advance of playout of the videos, a number of commercials to be inserted into the video and a length of those commercials. The stored commercials are made accessible through an API to apps running on the mobile device. The downloading includes regulating a pace at which commercials are downloaded based on commercials in the storage. The regulating includes downloading a lower-quality encoding of the commercials initially, followed by the downloading of higher-quality versions of these or other commercials. The downloading includes regulating the downloading of commercials based on rules. The regulating is based on a power state of the mobile device being above a threshold of charge, on whether a relatively lower cost connection is available, on whether a storage space of the mobile device is above a threshold, or any two or more of those conditions. The regulating may be based on a condition associated with a cellular data network. The condition includes when the cellular data network is in a period of lower use, the usage of the cellular data network by the mobile device during a daily, weekly, monthly, or other a time period, to the applicability of additional charges that will apply to the download, or any combination of two or more of those conditions. The downloading includes establishing a limit on use of the storage for downloaded commercials. The limit includes a quota of a maximum amount of storage to use. The quota includes a fixed number of commercials or a fraction of the storage capacity of the device. The downloading includes varying a quality of the commercials downloaded based on commercials stored on the mobile device. The downloading includes downloading lower quality videos first, and then replacing each lower-quality video with a higher-quality video. A request is received from a mobile device for commercials to be presented on the mobile device. A determination is made that the request is for commercials that may be presented on the mobile device at a time when the mobile device is offline. Commercials are selected for downloading to the mobile device based on the determination that the commercials may be presented when the mobile devices is offline.

In general, in an aspect, videos are stored on a mobile device for playback to a user and commercials are stored on the mobile device to be played back before, during, or after the videos in connection with playback of the videos. Upon the occurrence of a triggering event related to the suitability of a set of the commercials for being played back with videos, downloads are received of a set of commercials that are more suitable than the set of commercials that have become unsuitable. The more suitable commercials are stored on the mobile device. The less suitable commercials may be retained, or deleted from the device.

Implementations may include one or a combination of any two or more of the following features. A determination is made, at the mobile device, of which of the stored commercials is to be played back in connection with playback of each of the videos being played back. The triggering event includes at least one of (A) the passage of time, (B) at least a threshold portion or number of the commercials stored on the mobile device have become unsuitable, and (C) a change of location of the mobile device. The mobile device initiates the download of the more suitable commercials in response to the triggering event. A user can be presented one or more commercials through a user interface of the mobile device when the mobile device is not online. When the user invokes an interactive element on a commercial while the device is offline, information about the invoking is stored, and when the device is again online, the user is prompted to visit the website. When the user invokes interactive elements on two or more commercials while the device is offline, information about the invoking is stored, and when the device is again online, the user is enabled to to select from among the corresponding commercial web sites. The one of the stored commercials is one of an ordered sequence of commercials, and the one commercial is not played back until prior commercials in the sequence have been played back. A determination is made whether a video should be played back based on information about downloaded commercials and downloaded videos. The information about downloaded commercials and downloaded videos includes one or more of a number of downloaded videos, a duration of downloaded videos, and a number of insertion points for downloaded videos. No video is played back if the number of insertion points exceeds the number of downloaded commercials.

In general, in an aspect, at a mobile device, downloaded videos and commercials to be considered for playback before, during, or after the playback of each of the videos are received and stored. A determination is made at the mobile device which of the downloaded stored commercials should be played back in connection with the playback of the downloaded stored videos on the mobile device at times when the mobile device is offline.

In general, in an aspect, videos and commercials are downloaded to a mobile device for storage on the mobile device and later playout on the mobile device. The downloading includes downloading sets of appropriate commercials associated with the corresponding videos, each of the sets including a sufficient number of commercials for the corresponding video. Additional commercials that are not associated with specific videos are downloaded for playback in case commercials in the downloaded sets of appropriate commercials are no longer suitable for use with the corresponding videos.

In general, in an aspect, when a mobile device is offline, videos are presented to a user that have been downloaded to and stored on the mobile device, and commercials are selected and presented the presentation of the videos. At a time when the mobile device would have performed a tracking beacon with respect to the presentation of a commercial, an app records on the mobile device one or more of the following: (A) a URL of the server to which a call would have been made to perform the tracking beacon, (B) a timestamp that represents the time when the tracking beacon would have been performed, and (C) an identification of the commercial. At a time when the mobile device is again online, a call is made to the URL and the tracking beacon is performed.

In general, in an aspect, video commercials are downloaded to a mobile device to be used at the mobile device including for insertion in downloaded videos being presented on mobile device. At one time, a first set of video commercials is downloaded to the mobile device, having respective qualities of video formats and having a first total size. At a later time a second set of video commercials is downloaded to the mobile device having respective qualities of video formats and having a second, larger total size.

Implementations may include one or a combination of any two or more of the following features. At least some of the qualities of video formats of the video commercials in the first set are of lower quality than at least some of the qualities of video formats of the video commercials in the second set.

Other aspects, features, and implementations and combinations of them can be expressed as methods, apparatus, systems, components, methods of doing business, program programs, means and steps for performing functions, and in other ways.

Other aspects, features, and implementations will become apparent from the following description and from the claims.

DESCRIPTION

Figure 16:
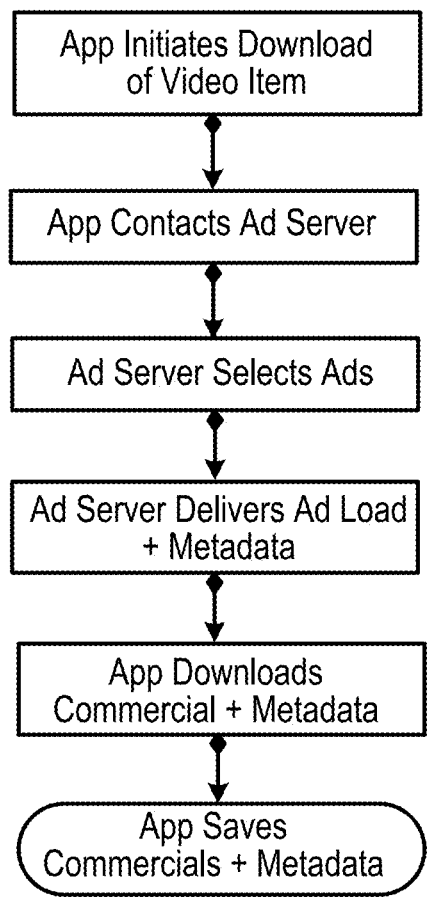
Figure 17:
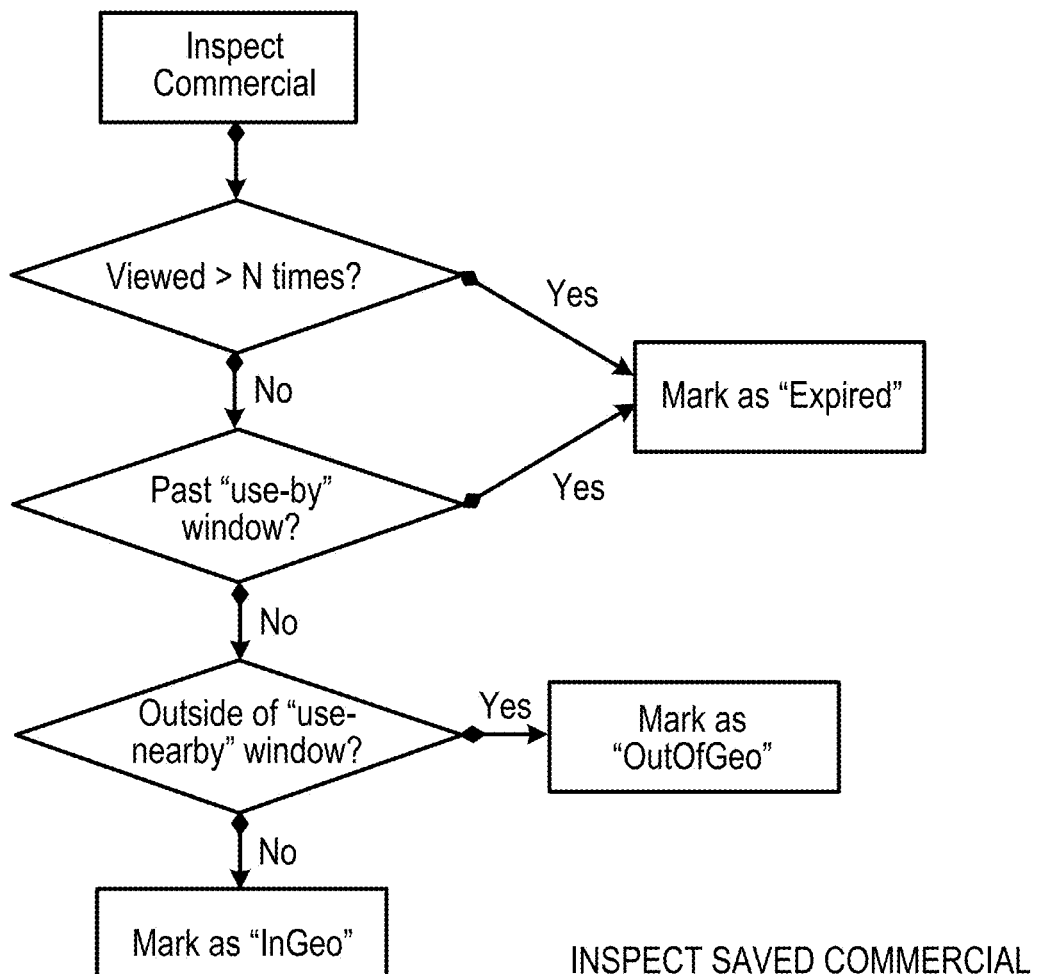
Figure 18:
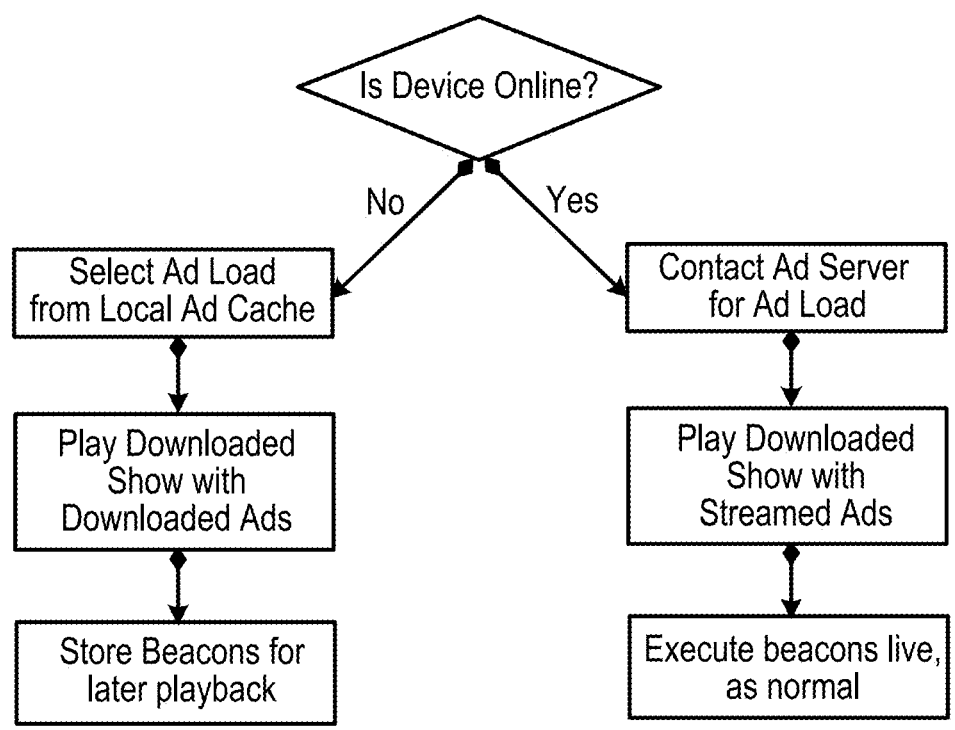

FIGS. 1 through 8 and FIG. 15 are block diagrams.
FIGS. 9 through 14 are screen shots.
FIGS. 16, 17, and 18 are flow diagrams.

In the following description, we use the term "app" or "application" or "mobile app" broadly to include, for example, an executable binary that is installed and runs on a mobile device, or a web site that the user navigates to within a web browser on the mobile device, or a combination of them. An "app" may also refer to multiple executable binaries that work in conjunction on a mobile device to perform one or more functions; for example, an Android service and an Android application that communicate with one another.

We use the term "app" in the context of video broadly to include, for example, any software, hardware, firmware, or combination of them that is able to access, accept, process, or play a video that is downloaded on or streamed to the mobile device. We use the term "system" broadly to include, for example, any set of components or facilities—mobile app, streaming video server, content delivery network, and possibly other elements, for example—that together comprise or provide or support a service that delivers video to devices and plays them for users of the devices. We use the term "streaming" broadly to include, for example, a service that allows a user to view a video on a device as the video is being delivered to the device, and in which the entire video is typically not stored persistently on the device. We use the term "mobile devices" broadly to include, for example, any portable device, such as a cellular-enabled phone, a tablet, or a laptop, that is capable of receiving a video stream over a wireless network and playing the video stream as it is received. We use the term "playing" broadly to include, for example, presenting the video on the mobile device for viewing by the user. We sometimes use the terms "playback" or "playout" interchangeably with "playing." We use the term "wireless networks" broadly to include, for example, 3G, 4G, LTE, 802.11 (also known as "WiFi"), Bluetooth, and other well-known protocols for wireless data delivery. We use the term "online" broadly to include, for example, having access to a network connection; and the term "offline" broadly to include, for example, not having access to a network connection.

We use the term "streaming video server" broadly to include, for example, any server accessible to the mobile device over a network connection and capable of delivering streaming video, for example, in conformity with Microsoft Smooth, Apple HLS, or other standard video-streaming protocols. We use the term "recommendation engine" broadly to include, for example, a system that uses historical data to identify items of potential interest to a user. We use the term "analytics server" broadly to include, for example, any server accessible to the mobile device over a network connection and capable of one or more of the following functions: receiving one or more files from a mobile device containing past activity on the device, persisting this information, aggregating this information with similar information received from other devices, and generating a graphical or tabular representation of this collected information.

Streaming Video

Streaming video to a mobile device has become a mature and popular technology. Pay-TV distributors (e.g., Comcast, Time Warner Cable, Charter, Cox), TV networks (e.g., HBO, ABC, AMC), and various Internet-based services (e.g., Amazon, Netflix, YouTube) each offer services that stream video over IP networks to mobile devices.

Typically, so-called video streaming over IP relies on one of two common Internet communication standards: TCP and UDP, each a protocol for delivering data from one machine on the Internet to another machine. Video streaming over IP can be performed in unicast mode, (i.e., one source delivering video to one receiver). In some cases, video streaming over IP can be performed in broadcast or multicast mode (i.e., one source transmitting to multiple receivers).

In conjunction with TCP or UDP, streaming video services typically rely on enabling technologies such as video-encoding protocols (e.g., Apple's HLS format and Microsoft's Smooth format) that are designed for streaming video. These protocols allow the user to experience smooth playout of the video even as network conditions deteriorate or improve during playout. These protocols also allow for a minimal delay between the user's request for the video and the start of video playout. From a mobile device, a user may access streaming video that has been encoded by one of the protocols, using a web browser like Safari or Chrome running on the mobile device. A user may also access streaming video using an application installed and running on the mobile device, such as Hulu Plus, Netflix, HBOGO, or SkyGo.

In some cases, the streamed videos may be "premium" content (e.g., HBO), access to which requires, for example, a monthly subscription fee. Such premium content typically includes few or no commercials (we typically use the terms ads, advertisements, and commercials interchangeably). In some cases, the streamed videos may originate from ad-supported networks (e.g., ABC, AMC, Fox), in which case the video may include commercials before, during, and after playout, or any combination of two or more of those.

A streaming video service may offer VOD (video-on-demand) or live TV, or both. By VOD, we mean a video service that offers a catalog of videos from which the user may select and view an item. Each of the videos in a VOD catalog was created at some time in the past; therefore at the time when a video is being played, the entire video is already in existence. In contrast, a live TV service offers a group of video streams each of which is being created in real time during streaming. Therefore, at the time when a current portion of a live video stream is being played, later portions of the same video stream are being created. In that sense, a live TV video is incomplete during the time when it is being played.

The general idea of managing the selection and insertion of commercials into streaming video is not new. Products that do so include Adobe Auditude, Freewheel, and BlackArrow.

Video Download

Recently, some companies have begun to introduce a video download feature as a new feature in their streaming products. Some companies have introduced exclusively video-download products, i.e., products that offer download but not streaming. In either case, video-download is a feature that allows users to download a video from a network data repository to a mobile device. Two examples of the former download-enabled services are Comcast's Xfinity Player and BSkyB's SkyGo Extra app.

We use the term "download" broadly to include, for example, any delivery of a video item in its entirety to a persistent non-volatile storage of a mobile device. In download, the recipient device stores the video persistently and can, for example, play out the video long after (e.g., minutes, days, weeks or longer) the delivery. The video item may consist of one file or of multiple files. The video item that is downloaded may be a VOD item or a live stream. In some cases, the mobile device may initiate the download process by, for example, transmitting an HTTP 'GET' request to a remote server that stores the object to be downloaded. In some cases, the mobile device may use a protocol, such as FTP, to fetch the video item from the remote source.

We use the term "non-volatile storage" or "persistent storage" broadly to include, for example, any technology such as magnetic disk drive or solid-state memory that retains stored data, for example, even while the device is powered off. Storing a video in the device's non-volatile storage means or storing it persistently that the stored video will remain on the device until the user or another application deletes the video. We use the term "data repository" broadly to include, for example, any storage mechanism that can deliver data to the requesting devices over a network connection. Within the context of video download, a "mobile device" is normally capable of storing the downloaded video on the device for later playout.

Among the advantages of a video-download feature are that a user can download a video from, for example, a VOD catalog when the user has access to a network connection, and the user is able to play the video later, when he or she does not have (or adequate) access to any network connection. For example, a user can download a TV show or movie to her mobile device while she is at home, before leaving for the airport. Later, while she is in an airplane, she can play out the downloaded video, even though she has limited or no Internet connectivity in the airplane.

An advantage of a video-download feature is that users can consume high-quality videos from a VOD catalog even if the user only has access to a low-quality network connection. For example, imagine the user wants to view on her mobile device a 10-minute video, which has been encoded in three formats: low quality (0.3 Mb/s), medium quality (0.8 Mb/s) and high-quality (1.8 Mb/s). Say the user has a 0.6 Mb/s network connection. Over this network connection, she can only stream the low-quality (0.3 Mb/s) version of the video. Attempting to stream the medium- or high-quality version of the video would fail, since the network connection cannot support the required data throughput. However, she can download the high-quality version of the video, even over the 0.6 Mb/s network connection. Over this network connection, the download would require about 30 minutes. Once downloaded, the high-quality video is available at the mobile device for the user to play out. Thus, using download, a user can play out a high-quality video, even lacking a corresponding high-throughput network connection.

An advantage of a video-download feature is time-shifting from a time when a live TV show is being shown, for example, a rugby game scheduled for noon GMT, which is 4 AM Pacific Time, to a later time that is convenient for a rugby fan living in California. To do this, the fan can set his mobile device to record the show at 4 AM, and then the fan can watch the saved show at, e.g., LOAM local time.

An advantage of a video-download feature is in reducing the use of expensive network connections. Typically, wireless operators like Verizon Wireless impose a monthly limit on cellular data usage, e.g., 2 GB per billing cycle, and impose an "overage" charge for data usage exceeding that limit in a given billing cycle. For instance, in mid 2013, the network operator Verizon Wireless assesses a $15 overage fee per GB used above the subscriber's limit in any one billing cycle. A Verizon Wireless subscriber with a 2 GB quota can stream about 5.5 hours of 800 Kb/s video in a given billing cycle over the Verizon network, before overage charges apply. In other words, this Verizon Wireless subscriber is limited to about 5.5 hours of streaming video over the Verizon Wireless network until overage charges apply. A benefit of download is that Verizon Wireless subscribers who can plan ahead (and who have access to a download product) can download one or more videos in advance using a WiFi connection (e.g., at home or in their office), and subsequently watch these videos at a time and place where WiFi connectivity isn't available, thus avoid the risk of an expensive overage charge. In other words, download enables "wireless-mode shifting" that reduces one's cellular data consumption without reducing one's overall video consumption.

A system that supports the downloading of videos to a mobile device may have some or all of the following features:

Using a mobile app or another tool (e.g., a web site, email, text messaging, or a TV set top box), the user may select a movie, an episode of a TV show, a live TV channel, or another video item and request that the video item be downloaded to the user's mobile device.

Using a mobile app or another tool (e.g., a web site, email, text messaging, or a TV set top box), the user may select an episodic program (e.g., a weekly TV series, podcast, or radio program) and request that some or all new episodes of the series be automatically downloaded to the device as they become available.

Using a mobile app or another tool (e.g., a web site, email, text messaging, or a TV set top box), the user may select an episodic program (e.g., a weekly TV series, podcast, or radio program) and request that some or all old episodes of the series be automatically downloaded to the device.

The user may delete downloaded video items, one at a time or several at a time, from the mobile device.

The system may automatically delete certain video items (e.g., older items, or items already viewed) to make room for new ones.

The mobile app may transmit information related to its past activity (e.g. which video items it downloaded and when) to an analytics server.

The system may employ a recommendation engine to identify videos that are of likely interest to the user, based on other videos the user has played and/or websites the user has visited, or other actions the users has taken. The recommendation engine may also rely on known behaviors of the user's friends (on social networks such as Facebook) to identify videos of likely interest. The system may automatically download these videos to the user's device.

The mobile device may query a remote server automatically, recurrently, for the existence of one or more new videos that the user has subscribed to, or that the recommendation engine has selected for delivery to the device. Instead or in conjunction with such queries, a remote server may trigger the mobile device to initiate the download by transmitting a signal to the mobile device. Server-initiated signaling protocols include, for instance, APN (Apple Push Notification) for Apple mobile devices and GCM (Google Cloud Messaging) for Android devices.

The user may view the status of currently-downloading videos and videos that are queued for download. The status may include, for example, the number of bytes downloaded and the number of bytes pending download, the percentage completed, the estimated time until download completion, and the number of videos to be downloaded in advance of a given video. We use the phrase "queued for downloading" to include, for example, scheduled to be downloaded to the mobile device but not yet completely downloaded to the device.

The system may download to the mobile device metadata along with the video item. Metadata may include, for example, a title, description, parental rating, closed-captioning, and an image corresponding to the video item.

The system may enforce time windowing on the downloaded video item. We use the term "time windowing" broadly to include, for example, any controlling of the times or time period during which a downloaded video item may or may not be played, e.g., a date after which (or before which or both) the video item is automatically made unplayable. At the time of forced expiry (the end of the time window), for example, the stored video item may be rendered unplayable or may be deleted from the device. Digital rights management (DRM) technologies, such as available from Adobe, Microsoft, SecureMedia, and Widevine, are one mechanism for enforcing the unplayability of a video based on the time windowing.

The system may perform downloading in the background. We use the term "in the background" to include, for example, any process that begins without requiring intervention by a user and/or that proceeds without notifying the user of the download's start, progress, or completion. For example, a user can specify that they want to download all new episodes of a TV show. The app can then download to the device all new episodes of the TV show, as the episodes become available. The user need not explicitly initiate or even be aware that a particular item is downloading. As another example, the app may automatically select video items that are likely to be of interest to the user (based, for instance, on other video items the user has recently viewed) and automatically download these items to the user's device; again in this case, the user need not explicitly initiate or request for a specific video item to download.

The user may receive an alert or "notification" by email, text message, or a visual or audible indicator on the mobile device, to indicate, for example, that the video has been successfully downloaded in full to the device and is now available for playout. (We sometimes use the word video interchangeably with the phrase video item.)

The system may perform downloading according to a set of rules that govern when downloading is permitted. For example, only when the device has more than 500 MB of free space, only when the device has more than 75% battery charge, or only when the device has a WiFi connection, or some combination of and two of these and other rules.

The system may download video items from a remote server on the public Internet, using standard protocols such as HTTP, TCP, and/or UDP.

The system may download video items from another device, such as a smartphone, tablet, PC, game console, or conventional digital video recorder (DVR). In each case, the source device (from which the video items are downloaded) contains a magnetic disk drive, solid-state memory, or other persistent storage device where video items are stored.

The system may download video items from a network or "Cloud" digital video recorder, which is a DVR in which the video items are stored not on the DVR itself, but on a remote network server.

The downloading may occur through some combination of broadband networks, WiFi, and Bluetooth. In some cases, the downloading may occur through a cable that attaches the source device to the target device.

The system may allow the user to configure some or all aspects of the behavior listed above.

Figure 9:
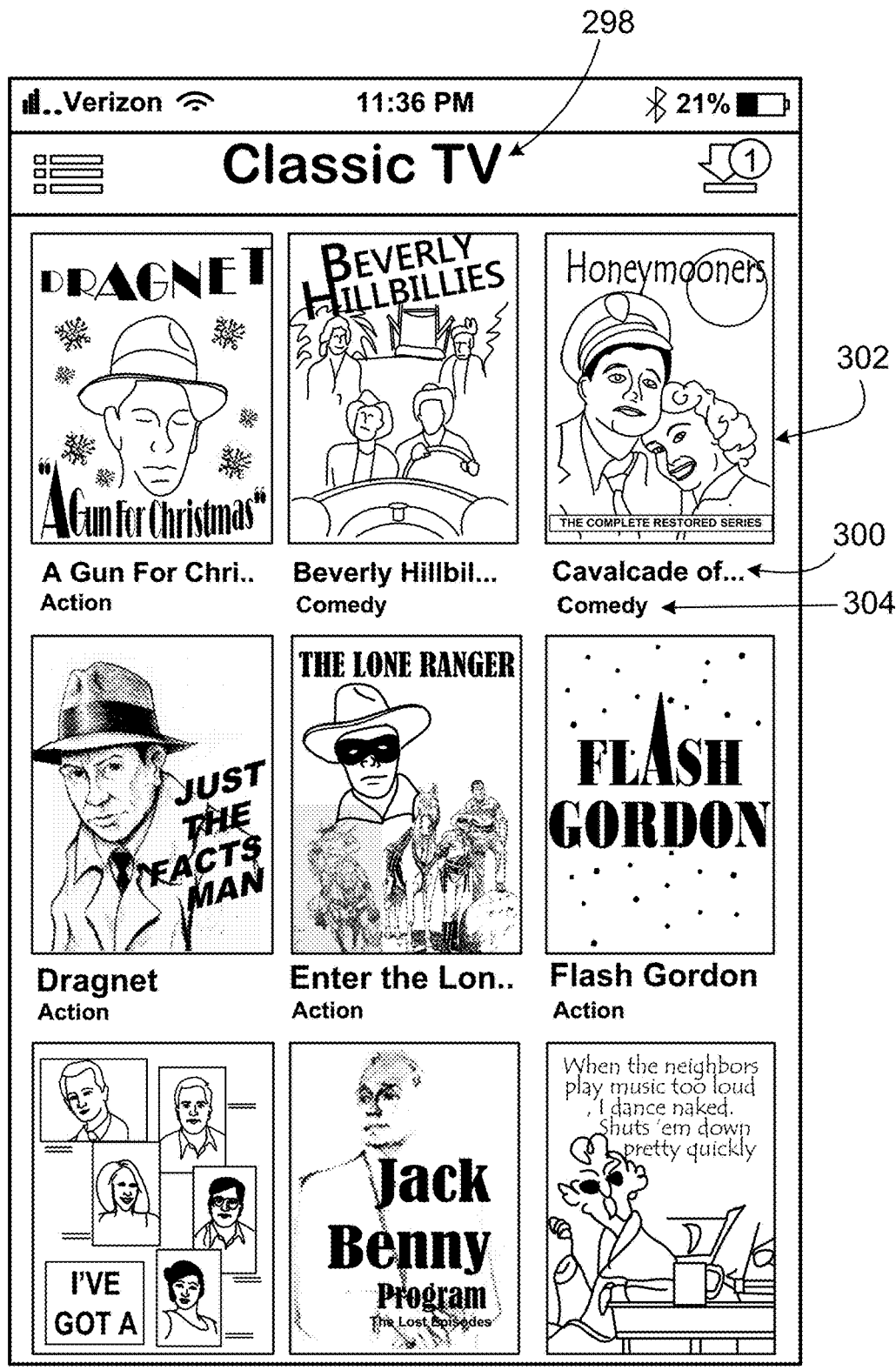

FIG. 9 illustrates a mobile device screen shot for an example VOD download system. The app presents the user a list or gallery 290 of videos that can be selected for downloading. The gallery may be grouped into broad categories 298, such as Classic TV. Listed items may display the title's name 300, cover art 302, and genre 304. Selecting an item may bring up an additional screen, FIG. 11, with further description of the title 306, runtime and video size information 308, and the option to stream the video now 310 ("Watch Now") or download the video for later viewing 312.

Figure 12:
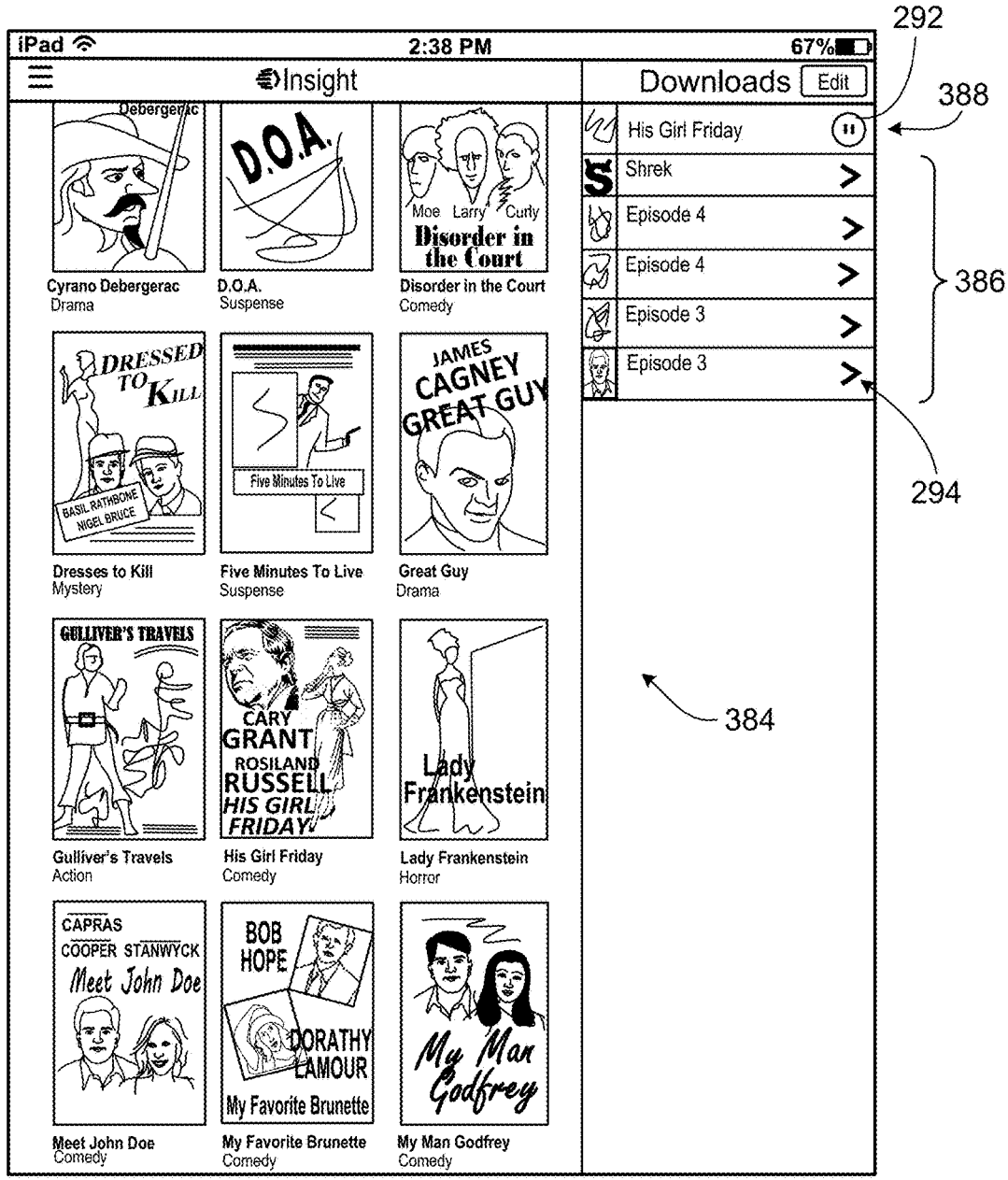
Figure 13:
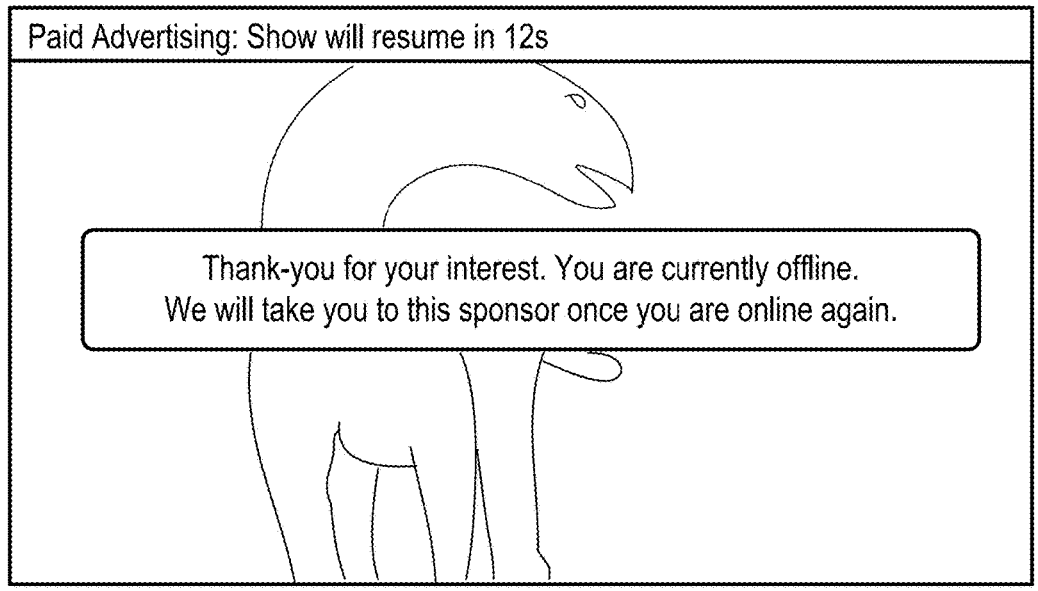

As shown in FIG. 12, the app can also present to the user a view of videos 384 that have been downloaded 386, or are in the process of being downloading 388, or are queued for download or may present any combination of those. These are videos that the user has explicitly requested to download, episodes of a series that the user has subscribed to, or videos that some other system element (for example, a recommendation engine) has elected to deliver to the device, for example. This view may be interactive: the user can see the progress 292 of pending downloads, and play 294 or delete 296 any of the fully-downloaded videos. The user may be able to pause, resume, and cancel a single or two or more queued downloads, or all queued downloads. Invoking the edit button in the upper right-hand corner of the screen brings up a menu that enables the user to delete downloaded items.

Online Video Advertising

Technology for managing, inserting, displaying, and measuring the viewing of commercials within streaming video is commonplace. Companies like Adobe, Freewheel, and BlackArrow have products that manage the selection and insertion of commercials into streaming video, and record when a commercial is presented for viewing. We use the term "measuring" broadly to include, for example, any tracking, observing, quantifying, recording, or generation of metrics that relate to display, performance, or presentation to a user and activities of the user associated with an commercial, for instance, recording whether a user triggers an interactive prompt displayed during the commercial (such as a pop-up that when clicked brings the user to a webpage for more information), or whether a user exits the video application instead of watching the commercial. We use the term "ad server" broadly to include, for example, any server that selects and delivers advertisements for placement into any kind of Internet-delivered content, such as web pages, audio, and video, or combinations of them.

The Internet Advertising Bureau (IAB), an industry consortium, has published a specification for the delivery and playout of ads within streaming video, called the Digital Video Ad Serving Template (VAST) (reference: http://www.iab.net/vast). Commercials may be of different types, including linear, companion ads, ad pods, and so on. The VAST specification describes the different types and is incorporated here by reference in its entirety. To simplify the discussion, we will focus on linear ads, but the techniques and systems that we describe here apply to the other ad types.

Figure 2:
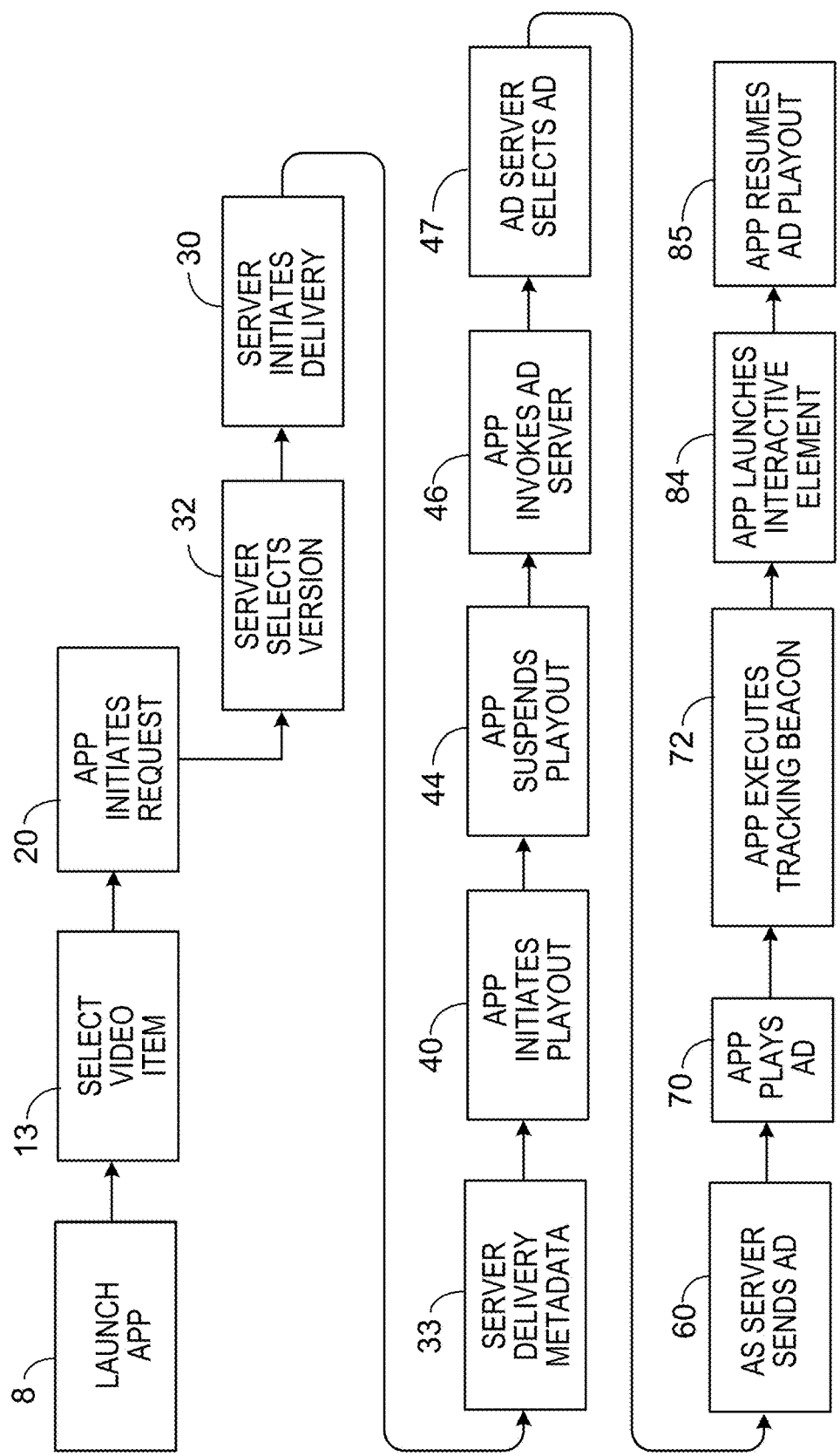

For background and as shown in FIGS. 1 and 2, we now present an example of the placement, delivery, and consumption of commercials within streaming video. For simplicity, this description omits some elements of the workflow, such as authentication, entitlement-checking, and the (often several) layers of redirection between the app and the ad server.

1 USER LAUNCHES APP 8: On a mobile device 54, a user 10 launches 8 an app 12. The app has been installed onto the mobile device prior to launch. The user selects 13 a video item 14 from a catalog 16 of video content 18 that is presented to the user by the app through a user interface 19 of the mobile device. The catalog presents to the user the video content that is available to the user and may consist of all or a subset of the overall inventory 18 of video content. The catalog may be stored on the mobile device and may update its listing of available videos based on communication with the inventory of video content 18. The catalog updates could occur according to a schedule or when the user launches the app or a combination of the two. The catalog may also be stored in a network data repository. In some cases, the user may select a channel from a menu of live TV channels.

2 APP REQUESTS VIDEO 20: After the user selects a video from the VOD catalog or a channel from the menu of live TV channels, the app initiates a request 22 to a streaming video server 24 for the selected item. At a minimum, the app request should contain information sufficient to identify the item selected by the user, such as the item's title, or some other unique item identifier that allows the streaming video server to identify the requested item from its inventory of videos. The request may contain a variety of other information, including information related to the mobile device, such as a list of supported video protocols, the screen size and supported video, and the number of supported audio channels. The request may contain identifying information about the user, which allows the system to validate that the user is authorized to access the selected item. The request may further contain preference information related to start-up time for the stream, tolerance for buffering during stream playout, and limits on data size of the stream. The app may indicate to the user that the request has been sent to the streaming video server or may indicate to the user that the request has not been made successfully only if an error occurs.

3 STREAMING SERVER SELECTS VIDEO VERSION: The streaming video server may maintain several different versions or "profiles" 31 of a given video 14, corresponding to different encoding qualities, for example, each appropriate for a particular range of network capabilities and particular device screen resolutions. For a given device request 22, the streaming video server selects 32 one version of the video item.

4 STREAMING SERVER PREPARES METADATA: The streaming video server will select and/or create a file or set of files containing metadata 34 corresponding to the video. This metadata may include, for example, a description of the video, closed-caption text for the video, a production date for the video, and "ad insertion points" 59. We use the term "ad insertion points" broadly to include, for example, any indication of where in a video an ad may be or must be inserted, for example, directives on the frames or times at which to insert commercials into the video.

5 AD SERVER SELECTS COMMERCIALS: The ad server 390 maintains an inventory 52 of commercials. The ad server stores the video commercials themselves, or instead, the ad server may only store links or pointers 392 to the commercials, which may be stored in other locations 394. The ad server associates a set of metadata 57 with each individual commercial in this inventory. The commercials themselves and the associated metadata may be supplied, for example, by the advertisers themselves (e.g. Lexus, Capital One or Walmart), or by an agency representing the advertiser (e.g. WPP, Omnicom, Publicis, Group M). Using a selection algorithm 51, the ad server chooses 47 (in FIG. 2, the location of the ad selection in the sequence of actions need not be as shown) a set of commercials 53 from this full inventory 52 of commercials. The number of selected commercials 53 will typically be equal to the number of insertion points in the video. We describe this commercial-selection process below in more detail.

6 SERVER INITIATES DELIVERY 30: The streaming video server begins streaming 30 the video to the device. The video may be delivered using the HTTP protocol, using a technology like progressive download or HTTP Live Streaming (HLS). Before or during this step, the streaming video server or ad server will also deliver 33 to the mobile device a set of links to the selected commercials. Each link may be, for instance, a URL (uniform resource locator or "web link") to a video file containing the commercial. The set of links may be in the form of an XML file which contains the URLs for the commercials, plus the insertion point for each commercial in the video item (i.e. a time offset, expressed in milliseconds, from the beginning of the video item).

7 APP INITIATES PLAYOUT 40: Some time after it has begun to receive the streaming video, referred to as the start-up time, the app on the mobile device commences playout to the user. It is typically not necessary for the streaming of the video to have been completed before playout commences.

8 APP SUSPENDS PLAYOUT 44: After a period of playout guided by the first insertion point previously delivered to the app, the app suspends playout of the video item.

9 APP PLAYS COMMERCIAL 70: The app plays one of the commercials previously delivered to the app. To play the commercial, the app may first open a network connection to a separate video server, which delivers the commercial to the app using a communication protocol such as UDP or TCP.

10 APP EXECUTES BEACON 72: The app may execute a tracking beacon 74 before, during, or after the commercial is played, or any combination of two or more of those times. A tracking beacon is essentially a network call 81 to a remote tracking server 80, which records that the commercial is about to be played, is in the middle of playout, or has completed playout on the mobile device. The tracking server 80 may be the same as the analytic server 80 or ad selection server 390, or it may be a different server. The data recorded by the tracking server may be provided later to the advertisers as verification that their commercials have been viewed by users.

11 APP LAUNCHES INTERACTIVE ELEMENT 84: In some cases, the user may perform an action through the user interface of the device (e.g., press a key 86 or tap on the screen 88) during playout of the commercial. Doing so may cause the app to stop playout and launch the device web browser 90 using the URL 91 of the advertiser 92 as the page to launch first. Instead of launching the device web browser, the app may instead display advertiser's content, contained in the commercial's metadata, through the app itself.

12 APP RESUMES COMMERCIAL PLAYOUT 85: If playout of the commercial is stopped during user interaction, the app may keep track of the commercial's progress so that the app can resume playout from that point of the commercial when the user is done with the interactive element. The app may forego resuming the commercial and instead resume the video (that triggered the ad) from the insertion point. The app may continue to play the commercial as a background (for example, dimmed) element of the user interface while the user interacts with the interactive element. The behavior of a commercial during user interaction with an interactive element 340 may be controlled by that commercial's metadata 342. Before launching the web page or in-app content of the advertiser, the app may prompt the user 94 to confirm 346 her intent (See FIG. 10). The user may view the web page or in-app content. When the user is finished, she can close this view and return to video playout.

The actions illustrated in FIG. 2 need not take place in the exact sequence shown, some of the actions need not occur at all, and other actions not shown may be part of the sequence.

When an app initiates a request for a video item, the ad server will select a corresponding group of commercials, among its inventory of commercials, for insertion into the video item during playout. The selection process can rely on one or combinations of any two or more of the following factors, among others:

when the commercial becomes active or expires or both: A commercial's metadata may specify that it may be played only after a particular "start window," or not after a later "expiry window," or both. For example, a retailer may purchase 100,000 impressions of a commercial for an upcoming President's Day sale, but not before 3 days prior to the sale, and not after 6 PM on the day of the sale. For another example, an advertiser may license a song from a musician for two weeks, after which time the advertiser no longer has the right to present the commercial with that music. The ad server will only select ads whose start window has passed but whose expiry window has not yet occurred.

the kinds of video items (or specific videos or series) into which a commercial may be inserted: An advertiser may negotiate the right to insert its commercial inside a certain set of video content, and to exclude its commercial from other video content. For example, an advertiser may wish to display its commercial inside sports-related videos, but not reality shows. We will call the former the "allowable" videos for that advertiser. The commercial's metadata may express this constraint. An ad server will only select a commercial if the video item is allowable for that commercial.

the number of overall impressions (views): Advertisers typically purchase a fixed number of "impressions" for a commercial. We use the term impressions broadly to include, for example, the number of times a commercial was inserted into the video and the user either watched the commercial to completion (allowed it to play through without exiting out of the app) or triggered an interactive element from the commercial or a combination of the two. The commercial's metadata may express this information in some manner. The ad server may use the number of remaining (paid-for but unfulfilled) impressions as a selection criterion.

the specified sequence of commercials: An advertiser may require that a series of related ads be viewed in a particular sequence. For example, a car manufacturer may wish to present to each viewer a sequence of ads: first a superficial product "teaser" showing the exterior of the car in motion, then a more revealing description of car's interior, and finally, pricing and local dealer information. A commercial's metadata may include whether the commercial is part of a sequence, uniquely identify that sequence, and also indicate the commercial's place within that sequence. By using selection criteria that respect sequence ordering, commercials in a sequence may be inserted into a video at their proper order.

demographic information about the user: The ad server may employ in its selection criteria the location of the user (e.g., a GPS location or a coarser metric such as the city/state), the make and model of mobile device (e.g. Apple iPad 3), and, where available, any other personally-identifiable information such as age and gender.

The idea of delivering commercials to mobile devices for later playout is not new. Companies that have done so include Goldspot (http://gigaom.com/2010/03/05/goldspot-delivers-mobile-ads-while-you-sleep/) and Transpera (which delivered to mobile phones video ads inserted into web pages displayed on the mobile phone).

Here we describe a system that, among other things, handles the insertion, measurement, and interactivity at the mobile device, during the playing or videos and while the device is not connected to a network.

Figure 3:
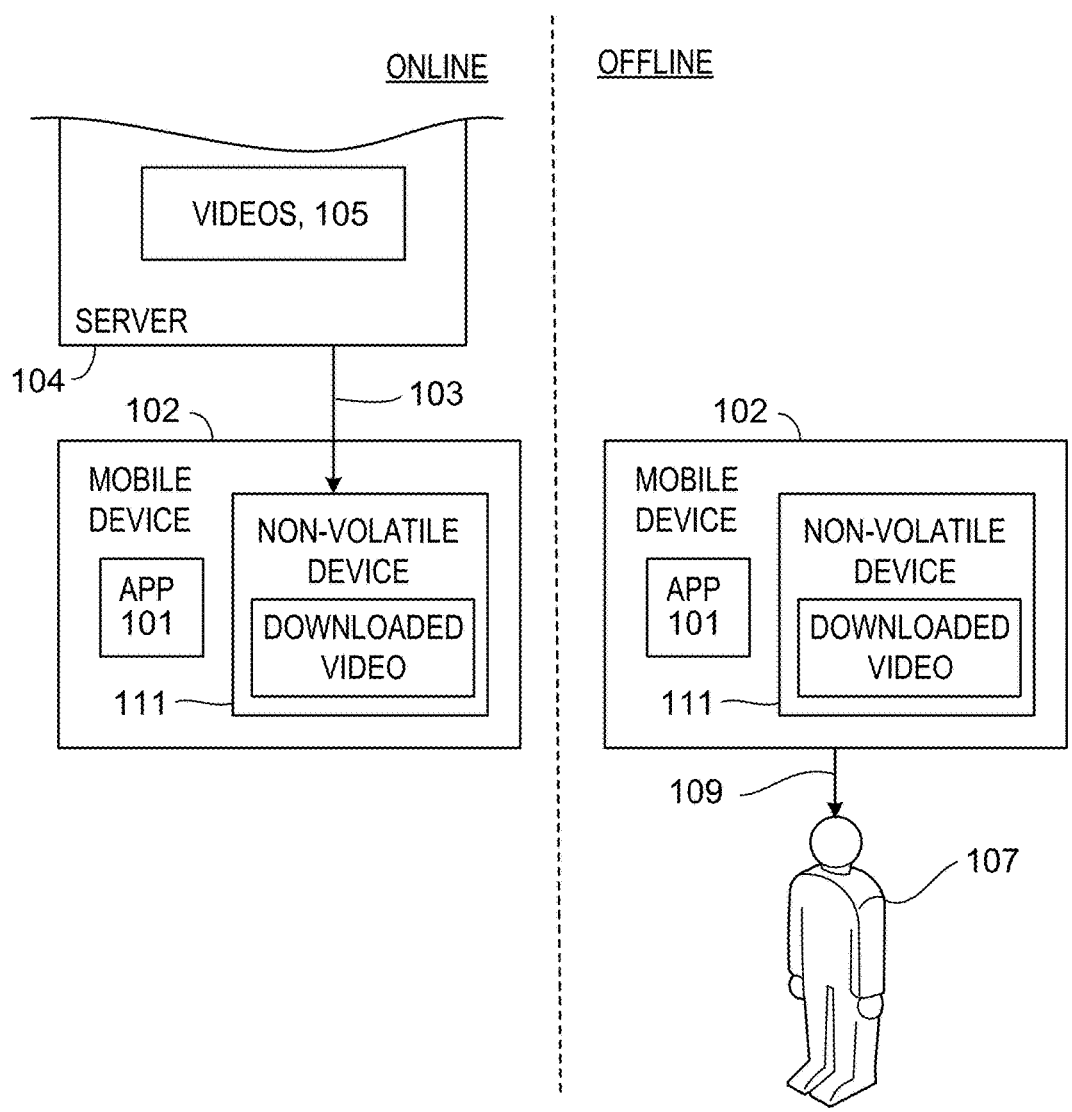

As shown in FIG. 3, consider an app 101 installed on a mobile device 102; the app (when the mobile device is online, as shown on the left side of the figure) supports downloading 103 videos 105 from a server 104 for later playback (when the mobile device is offline, as shown on the right side of the figure). Each downloaded video is stored on the device's non-volatile storage 111. In some cases, once the videos are downloaded, the user 107 may initiate playback 109 of a previously-downloaded video while the mobile device is offline.

The system and techniques that we describe here are designed to support download and offline playout of ad-supported videos, among other things.

Some key features include:

1. OFFLINE CACHE OF COMMERCIALS: The system maintains an offline cache of commercials on the mobile device at all times. These commercials are delivered to the device and saved in the device's non-volatile storage, so that if the user plays out a downloaded video while the device is offline (or in some examples, when the device is online), downloaded commercials will be available for playout before, during, and after playout of the video. We use the term "offline cache" broadly to include for example, any kind of non-volatile storage space on the device that is allocated for commercial video and ad storage and over which the user generally has no file-level control (such as playing and deleting videos). The user may have the ability to configure the size of the offline cache. In some examples, the cache may be implemented using dedicated non-volatile memory on the device. In some cases, the cache may be implemented in software at the app or OS level, using general user storage space.

2. SELECTION FROM OFFLINE CACHE: During offline video playout of a downloaded video, at every ad-insertion point (before, during, or after the playout of the video), the app may select a commercial from the offline cache of downloaded commercials and play the commercial, without having to contact any remote server, including the ad server. In some cases, even during playout of downloaded video while the device is online, the app may still rely on the offline cache of downloaded commercials. FIG. 18 shows the parallel workflows for ad selection when the device is online and offline If the device is online, the device context the ad server for ads and plays the downloaded video with ads streamed from the server. Tracking beacons are executed in real-time. If the device is offline, ads are selected from the local ad cache, the downloaded video is played with selected downloaded ads inserted, and tracking beacons are stored for later playback when the device is again online.

3. RECORDING OF OFFLINE PLAYOUT: During offline video playout, the system records the identity of each played commercial, as well as the time of playout, the location of playout, the identity of the video, and the insertion point within the video. This information is saved on the mobile device, and transmitted from the mobile device to a remote server when the device's network connectivity is restored. In some implementations, other kinds of information could also be recorded, saved, and transmitted with respect to played commercials.

4. INTERACTIVITY WHILE OFFLINE: Commercials on mobile devices often include interactive elements that enable users to perform actions or cause actions to occur. During offline video playout, if the app plays out a commercial that includes an interactive element, the app will record if the user performed an action, for example, indicated (for example by tapping on the device screen) that the user wanted more information about the advertiser. The app will later, once network connectivity is restored, cause corresponding actions to occur, for example, by providing the user the ability to access the requested information (e.g., a web site).

Important functions of the system include: selecting commercials; downloading commercials from a server; ensuring the device has access to a sufficient number of commercials; providing access to commercials; refreshing the cache of commercials on the device; recording viewings by users of commercials; and enabling interactivity associated with the viewing of the videos or commercials; and combinations of any two or more of those functions and others.

We cover each of a number of these aspects in turn.

Figure 4:
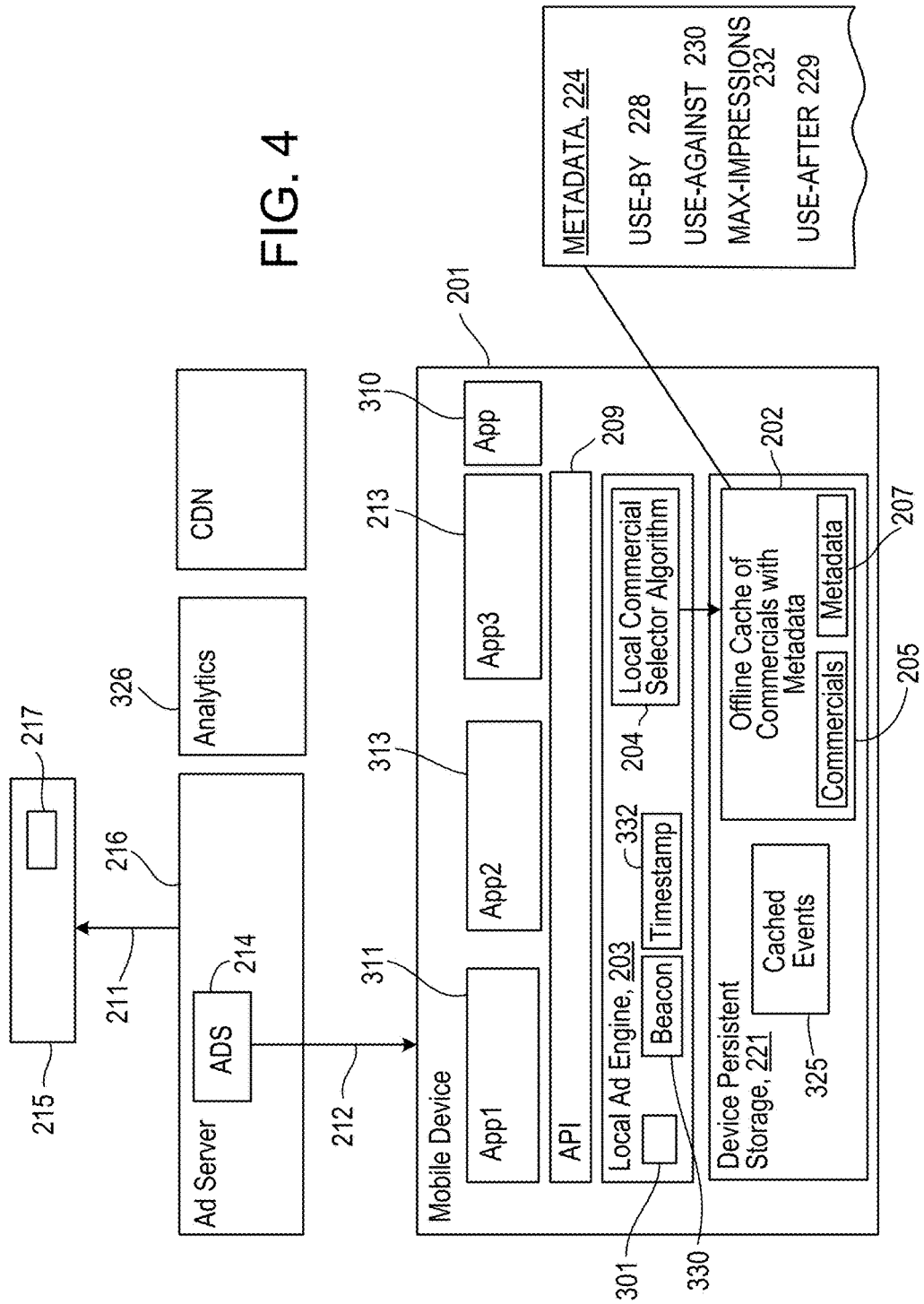
Figure 5:
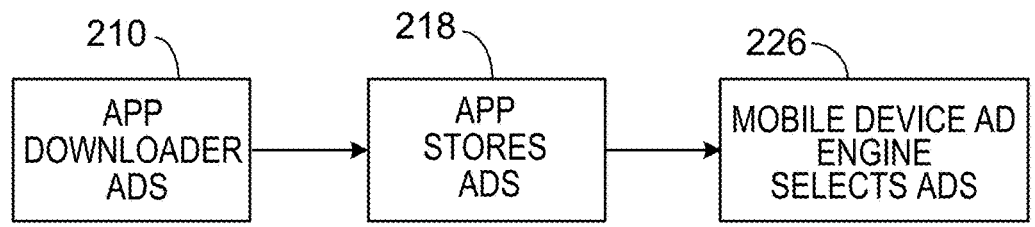

We refer to FIG. 4, which is somewhat similar to FIG. 1. An important difference is that in FIG. 4, the mobile device 201 now includes an offline cache 202 of commercials 205. The offline cache also stores metadata 207 for each commercial. The device also includes a local ad engine 203 that executes a selection algorithm 204 to choose commercials from the offline cache 202, using the metadata 207.

Selecting Commercials

In the streaming scenario, selecting commercials is entirely the responsibility of the ad server; typically, no element on the mobile device (including the app) has any responsibility for selecting commercials.

The system and techniques that we describe here change this approach to support offline playout of downloaded videos and commercials in a number of ways including one or more of the following and combinations of any two or more of them:

When the app downloads a video, it contacts the ad server to request a set of corresponding commercials. The ad server performs a selection algorithm to identify a group of commercials, just as described above in the streaming scenario ("AD SERVER SELECTS COMMERCIALS"). In this case, the app downloads the selected commercials for later playout.

When the system downloads 210 a commercial 212 to the mobile device and stores it 218, the system also downloads a set of metadata 224. The local ad engine 204 uses this metadata to help guide its selection 226 of one or more commercials from among the locally-stored commercials.

In some cases, the metadata may can be embedded in the commercials and therefore necessarily downloaded with them. In some implementations, the metadata can be stored and delivered separately and associated with the commercials. Any of a wide variety of arrangements can be used to associate the metadata with the commercials. Some metadata can be associated with more than one commercial; in some other cases, each commercial has its own metadata, not shared with other commercials.

A wide variety of fields of metadata can be defined and used, including:

- A 'use-by' field 228: the date or time after which the commercial must be disabled or deleted from the device cache. We sometimes refer to the 'use-by' value as the expiry of the commercial.
- A 'use-after' field 229: defines the start date or time for use of a commercial.
- A 'use-against' field 230: specifies the allowable video content, specific videos, or kinds of videos or video series that this commercial may be inserted into.
- A 'max-impressions' field 232: specifies the maximum number of times this commercial should be shown on this device.
- A 'use-nearby' field: specifies that the commercial should only be shown when the mobile device is within a certain distance from a geographical marker (e.g. within 20 miles of Cleveland, Ohio or within 800 meters of Joe's Clam Shack on Hilton Head Island, S.C.).

Other metadata delivered with the commercial could include, for example, information that instructs the app to show the commercials in a certain sequence. Any combination of two or more such fields, and other fields, can constitute the metadata for a commercial.

In some implementations, for efficiency in transmitting the metadata from the ad server to the mobile device and storing the metadata on the mobile device, the amount and the fields of metadata that is downloaded to and stored on the mobile device are smaller or fewer than the amount of metadata and the fields stored on the server in scenarios such as the ones described earlier. In such implementations, we call this set of metadata delivered to and stored on the app a "reduced set of metadata". We refer to this set as reduced in that it may and typically is a set of less metadata than the set 57 shown in FIG. 1 used by a remote server to select commercials. In some cases, it is possible to send more metadata to the mobile device than can be stored there and to have the mobile device store only a subset of what is downloaded. In some cases, different mobile devices that have different storage capacities could receive the same sets of metadata and reduce those sets to different subsets to be stored locally. The metadata may be delivered with the related commercial but also could in some implementations be delivered separately or a combination of the delivery techniques could be used Prior to or during playout of a video, the local ad engine 204 consults this metadata to select from among the cached commercials those to be inserted into the video, or before or after the video.

Figure 6:
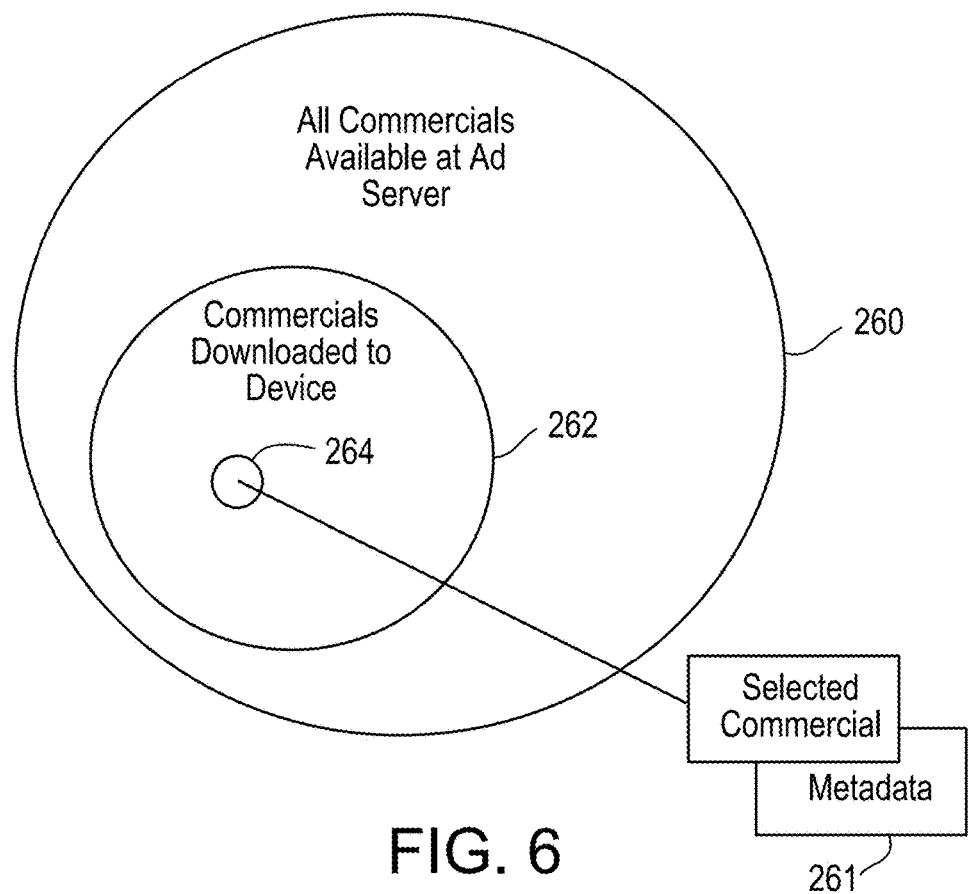
Figure 7:
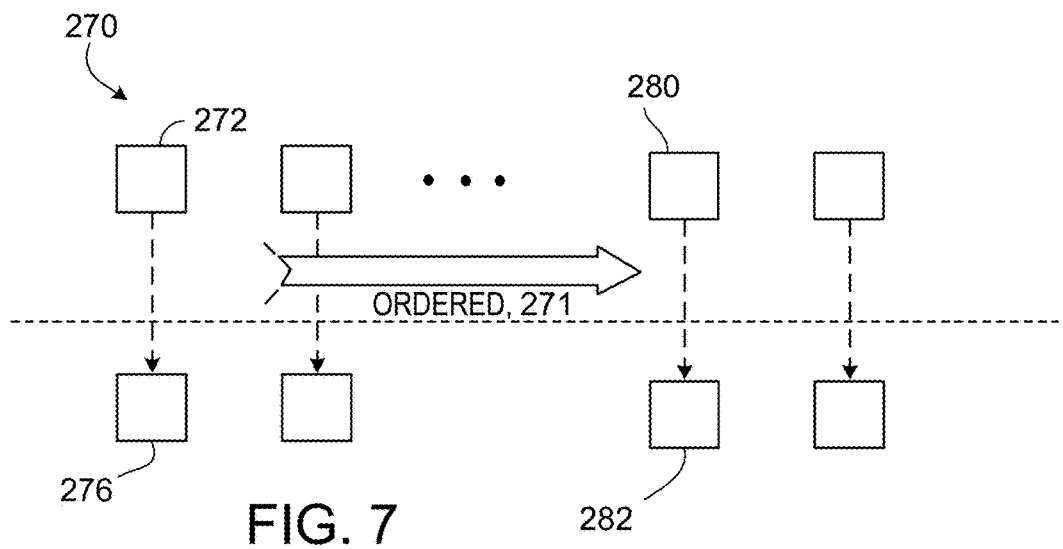

As shown in FIG. 6, the ad server selects, from a universe of all commercials 260 available at the ad server a group of commercials to download 262 to the mobile device. From among the downloaded commercials, one is selected 264 for playout at any given insertion point in a video.

In making its selection of commercials, the ad server may take into account that the mobile device will be downloading the commercials for later playout, perhaps offline. The ad server will be aware that the mobile device will be downloading the ads, from information sent by the device to the ad server in the request (e.g., information indicating that the request comes from a specific user-agent such as a "download-player"). The ad server may alter its selection accordingly. For instance, the ad server may not select interactive commercials, since most interactive elements work best with a live network connection.

The process of selecting and downloading commercials and metadata to the mobile device is depicted in FIG. 16. As shown in FIG. 16, the app initiates the download of the video item and then contacts the ad server. The ad server selects appropriate commercials and delivers them with metadata to the device. The commercials and the metadata are saved on the device for later use.

Managing the Cache of Commercials

In some circumstances, an insufficient number of downloaded commercials, with respect to the number of downloaded videos, the total duration of downloaded videos, the total number of insertion points for all the downloaded videos, or some combination of any two or more of these and other factors, may cause the app to prevent playout of some of the downloaded videos. For instance, a downloaded video may have three commercial insertion points. If the device currently holds only two downloaded commercials, the app may indicate that the video cannot playout offline until additional commercials are available.

Downloading can occur in bursts in which two or more or a large set of commercials is downloaded at one time, or can be distributed so that individual commercials are downloaded from time to time, or any combination of those. The app may download a large number of commercials in low quality video formats, to quickly populate the offline cache, and subsequently download higher-quality versions of these (or other) commercials. For example, the app may download twenty commercials, each 15 s in duration and encoded at 0.3 Mb/s, for a total size of 11.2 MB. Subsequently, the app may download a new batch of 20 commercials, each 15 s in duration and encoded at 0.9 Mb/s, for a total size of 33.6 MB. The replacement of lower-quality versions by higher-quality versions need not be done in batches but can be done individually, for example. The logic for deciding how many commercials to download and how frequently to replace the commercials may reside on the app (at the mobile device), or may reside at some other system component.

The app receives and stores 218 these downloaded commercials on the mobile device, e.g., in the offline cache 202 on the mobile device's non-volatile storage 222.

The app may be configured to have a quota, a maximum amount of non-volatile storage to use in storing downloaded commercials. For example, a 200 MB quota is enough space for 100 video commercials each of size 2 MB. The app may set the quota as a fixed number, or as a fraction of the overall non-volatile storage capacity of the device, or in any of a variety of other ways. The quota can change from time to time depending on various factors.

The app may adhere to a set of rules 301 (FIG. 4) governing when commercials may be delivered from the server to the device's offline cache, e.g., only when the device is above 50% charged, only when the network connection is WiFi; only when the device has at least a certain amount of available storage space, or a combination of any two or more of those and other factors. The app may adhere to a set of rules governing when it can download commercials over a cellular data network, e.g., only between midnight and 5 AM, when the cellular network is not in heavy use. The app may regulate the amount of data it consumes over a given time period (e.g. daily, weekly, monthly) over a cellular network, to avoid "overage charges" that are imposed on cellular subscribers who consume excessive amounts of cellular data.

The app may moderate the pace at which it downloads commercials based on the number of commercials stored in the offline cache. For instance, the app may download commercials with all available bandwidth until the app reaches a minimal threshold of (e.g., 20) commercials in the offline cache, and then only download at most 10 new commercials per week.

The app may download commercials before, during, or after the download of user-selected videos or in any combination of two or more of those times. It may do so without the user being aware that the downloading is occurring. It may do so in the background, without the app or any of its features being shown on the device's screen. It may do so automatically, on a preset interval (e.g., every day or every week).

Figure 8:
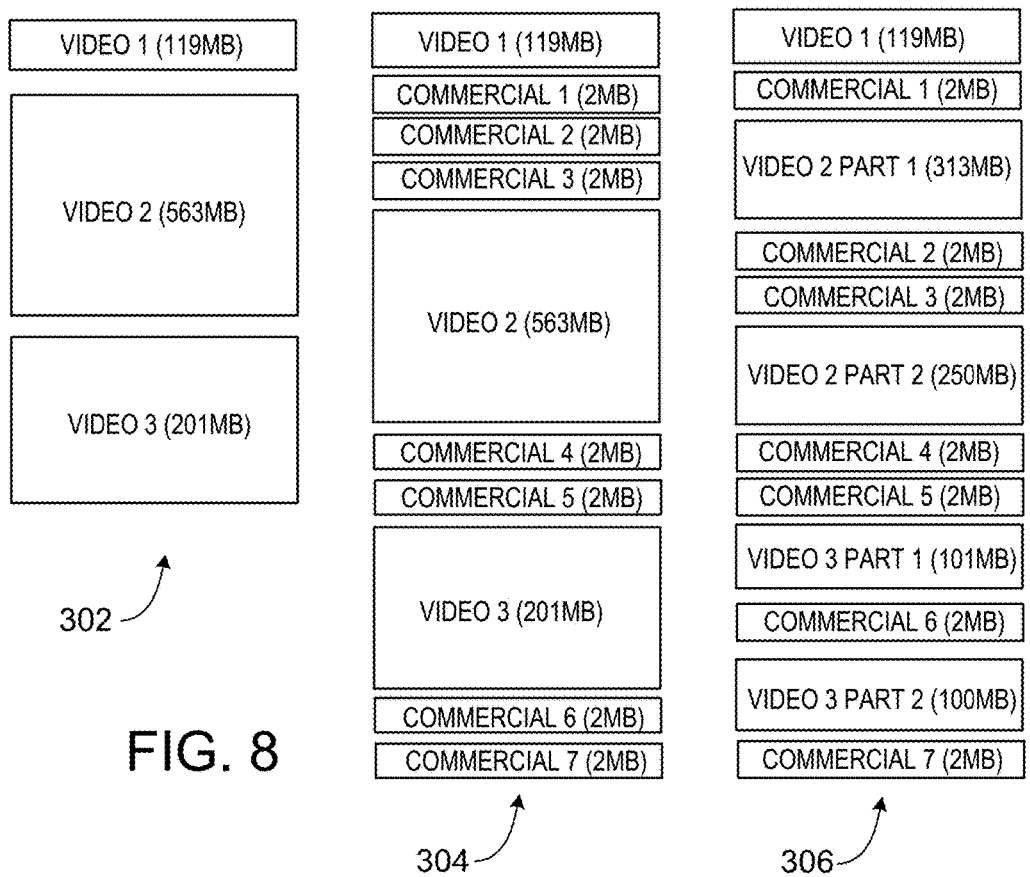

The app may interleave the download of commercials with the download of videos. For example, the app may have a queue of five user-requested videos (totaling 400 MB) and fifteen commercials (totaling 30 MB) for a total download queue of 430 MB. The app may alternate (one by one or in groups) the download of queued videos with queued commercials in any sequence over time. The app may or may not indicate to the user that it is downloading commercials. The app may separate a queued video into several parts, and insert a commercial (or part of a commercial) between downloading each part. As shown in FIG. 8, for example, on the left 302, the queue includes simply three user-selected videos to be downloaded in order. In the middle 304, the queue has been altered so that seven commercials have been interleaved in the download queue. To the right 306, the user-selected videos have been broken up and commercials have been interleaved not only between complete videos but also between smaller parts of full videos.

In some implementations, commercials may "belong" to a specific show and can only be played in conjunction with that show. In the terminology we introduced above, the metadata for the commercials would specify a particular show in the 'use-against' field. For example, an advertiser (Walmart, say) may purchase a set of impressions against the show "Survivor" or against a specific episode of "Survivor." In this scenario, when downloading commercials, the app will download a set of appropriate commercials for each downloaded video item. Since a 45-minute TV show typically contains 15 minutes of commercials, the app will download 15 minutes of commercials for a 45-minute downloaded video item. One might think of the cache of commercials on the device as segregated into groups, one group belonging to each downloaded video item.

The app may download a set of "backup commercials" which are available for insertion when no other commercial is available. Typically, a backup commercial will have minimal constraints on when it can be played—at any time, inside any video item, and no expiry, among other examples. A backup commercial might be, for example, a general promotion or a public service announcement that has no inherent expiry. The app may select one of the saved backup commercials in case another commercial that has an association with a video program is not available for playout (e.g., they have all expired.)

The app will not typically present a list of downloaded commercials for the user to view and interact with; rather, the app will silently store and manage these commercials, without explicitly informing the user. The app may present a minimal view to the user showing only that commercials are downloading.

Some mobile devices support the notion of multiple users, each with their own login to the device. For example, starting with version 4.2, Android devices support multiple users on a single device, each with their own login. In some instances, the app can provide a separate local ad cache 380 for each user 382, and draw from that user's cache when that user is logged in (see FIG. 15). One advantage of doing so is that the advertisers can target individual users, not just devices. A husband and wife sharing a single tablet may then see different commercials inside the same downloaded TV show or other video.

Refreshing the Cache of Commercials

From time to time, the app may refresh its set of cached commercials.

The refresh may be initiated from the app itself. The refresh may be initiated from a server that sends a signal (e.g., and Android Push Notice or Apple Push Notification) to the app on the device to perform the refresh. Triggering events for a refresh may include (among other) any one or a combination of any two or more of: (a) when a certain amount of time (say 3 days) has elapsed since the app last performed a refresh of its cached commercials, (b) when a certain number or fraction of cached commercials have expired, and (c) when the location of the mobile device has changed significantly (e.g. more than 50 miles) and a sufficient number of cached commercials are now marked as "OutOfGeo."

Based on one of these triggering events, the app may initiate a refresh of its cache of commercials. That is, the app will contact the ad server to request a new inventory of commercials.

The app may mark as expired any commercial that has been played the number of times specified in its associated metadata (defined above as "max impressions"), denoted by Q. The app may mark as expired a commercial which has been played at least Q-k times, where k is a fixed parameter in the app, for example 3. The app may mark as expired a commercial that is past its "use-by" metadata. The app may mark as expired a commercial that that has resided on the device for a duration of time T, where T is a fixed parameter in the app, for example one week. Various combinations of any two or more of these and other conditions may also be applied to control the expiry of commercials.

The app may mark as "OutOfGeo" any commercial for which the "use-nearby" metadata indicates a different location from where the device is now.

FIG. 17 depicts an example of the process by which the app evaluates a single cached commercial. The app inspects the commercial. If it is been viewed more than 10 times, it is marked as expired. If it has not been viewed more than 10 times, and the current time is past the "use-by" window, the app also marks the ad as expired. If the ad has not been viewed more than 10 times and is not passed the "use-by" window, the app checks whether the location of the mobile device is outside of the "use-nearby" window. If so, the ad is marked as "OutOfGeo". Otherwise, the ad is marked as "InGeo".

When the refresh occurs, the app contacts the ad server to request a new commercial to use in place of some or all of the cached commercials. At the very least, the app will request a replacement commercial for any expired commercial. The app may also request a replacement for any commercial marked as "OutOfGeo." The app queues the new commercials for download.

As an example of the "location change" criteria, imagine that the app detects (using standard location-based APIs available on mobile platforms such as iOS and Android) that the device has moved from New York City to Cleveland, Ohio. Transparently and without the user needing to be aware of it, the app will then mark all appropriate commercials as "InGeo" or "OutOfGeo." When a subsequent refresh occurs, the OutOfGeo commercials may be replaced or retained in case the user moves back into the relevant geographical area.

Providing Access to Commercials

In some implementations, the downloaded commercials are used only for insertion into videos that are played by one app on the device. However, in some implementations, other apps and features of the mobile device can make use of the stored commercials and associated metadata for a wide variety of purposes.

For example, a phone-dialing app 311 (FIG. 4) can play out a previously-downloaded video commercial while the user is waiting for the call to go through. An app can play out a previously-downloaded commercial every time the device is powered on. A game app 313 can require the user to view a previously-downloaded commercial before playing the game. Another video-playing app 310 can select from among the previously-downloaded commercials and play out one or more at pre-specified insertion points. The creators of an app may publish two versions of the app for download and installation: a free version that draws on one of the previously-downloaded commercials on every app launch before the user may use the app, and a paid-for version which is free of commercials.

In some implementations, to make it easier for app developers to take advantage of the stored ads and metadata, the app (or even the operating system of the mobile device) can expose an API (application programming interface) 209 (FIG. 4) to other apps 213 installed on the device, to permit those other apps to request (and then playout) one or more commercials from the set of previously-downloaded commercials. We call the software component of the app that provides this functionality a "client ad engine." The API may provide a mechanism by which the other apps can request a commercial; the client ad engine will select from among the stored commercials to choose an appropriate commercial. The API may also permit other applications to add commercials into the set of stored commercials.

Therefore, in some implementations, apps loaded on and running on the mobile device can invoke the client ad engine to use the stored commercials for a variety of purposes.

The following is an example of a simple API.

String getStoredCommercial(String appID); // returns URL on disk of selected commercial
bool saveStoredCommercial(String commercialURL); // register a new downloaded commercial
bool recordPlayoutOfCommercial(String commercialURL); // record that a commercial was played Thus, multiple apps 213, 310, 311 and 313 can use one common client ad engine 203 on the device through the API.

Recording Views and Tracking and Measuring Usage of Ads

Typically, streaming video systems include one or more mechanisms for recording when a mobile device has begun, is somewhere in the middle of playing, or has completed playout of a commercial. As previously discussed, tracking beacons are one common mechanism. Tracking beacons are typically a URL (i.e. the address of an remote Internet server) that the device connects to in order to register this event. Typically, an application or web browser will perform a network call (typically using HTTP) to the URL. The network call typically contains information including the "user-agent" (a description of the device performing the network call) and perhaps information stored from a previous transaction (e.g. one or more web cookies).

The device must be online to execute the network call for the tracking beacon. When the device is playing a previously-downloaded commercial and the device is offline, the device cannot reach a remote server to perform the tracking beacon, or to in any other way report that a commercial has been played and cannot report any other metrics concerning the use of commercials on the device.

Instead, in some implementations, the app records on the mobile device the URL of the tracking beacon, along with a timestamp recording exactly when the device would have performed the network call to the URL if the device were online. More generally, the app records the identity of each commercial that is played, along with a timestamp recording exactly when each commercial was played. The app may also record other information related to the playout of the commercial, including, for example, the location of the device during playout of the commercial, the identity of the video that the commercial was inserted into, and the duration of the commercial that the user played. Other kinds of information and combinations of information can be recorded. We call this information for a commercial, collectively, an "impression event." The impression event is stored on the device's non-volatile memory in a cache 325. The cache may contain multiple impression events recorded over a period of time.

When the cache is non-empty, the app checks for network connectivity at regular intervals, and uploads this set of recorded impression events from the cache to a remote server (i.e. an analytics server) that accumulates this information (the server is labeled analytics 326 in FIG. 4) when it can. It may be several hours or even days before an impression event is transmitted from the mobile device to the analytics server 326. In some implementations, the app may automatically perform the network call (to the URL of the tracking beacon) to a remote server once the device regains network connectivity, whether or not the app is active or running at the time the device regains network connectivity. In some implementations, the app may upload a file containing the stored tracking beacons to another server (a proxy), which itself performs the network calls on behalf of the app.

In the download scenario, the app will be playing a previously-downloaded commercial. If the device is online when the commercial is played, then the app may perform the network call to execute a tracking beacon. If the device is offline when the commercial is played, the app may store the beacon 330 along with a timestamp 332 of when the beacon was encountered. At the next or subsequent opportunity when the device has network connectivity, the app may call the beacon URL along with the timestamp.

Interactivity

Figure 10:
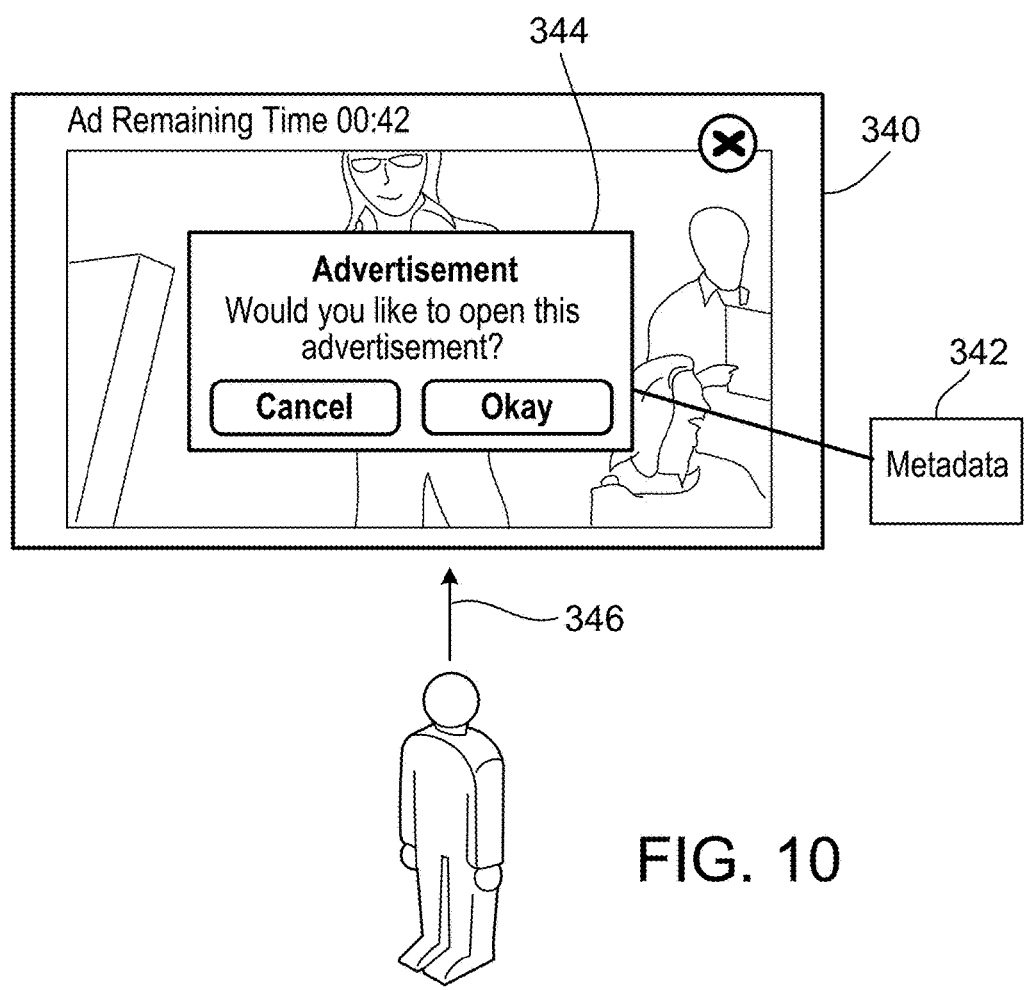
Figure 11:
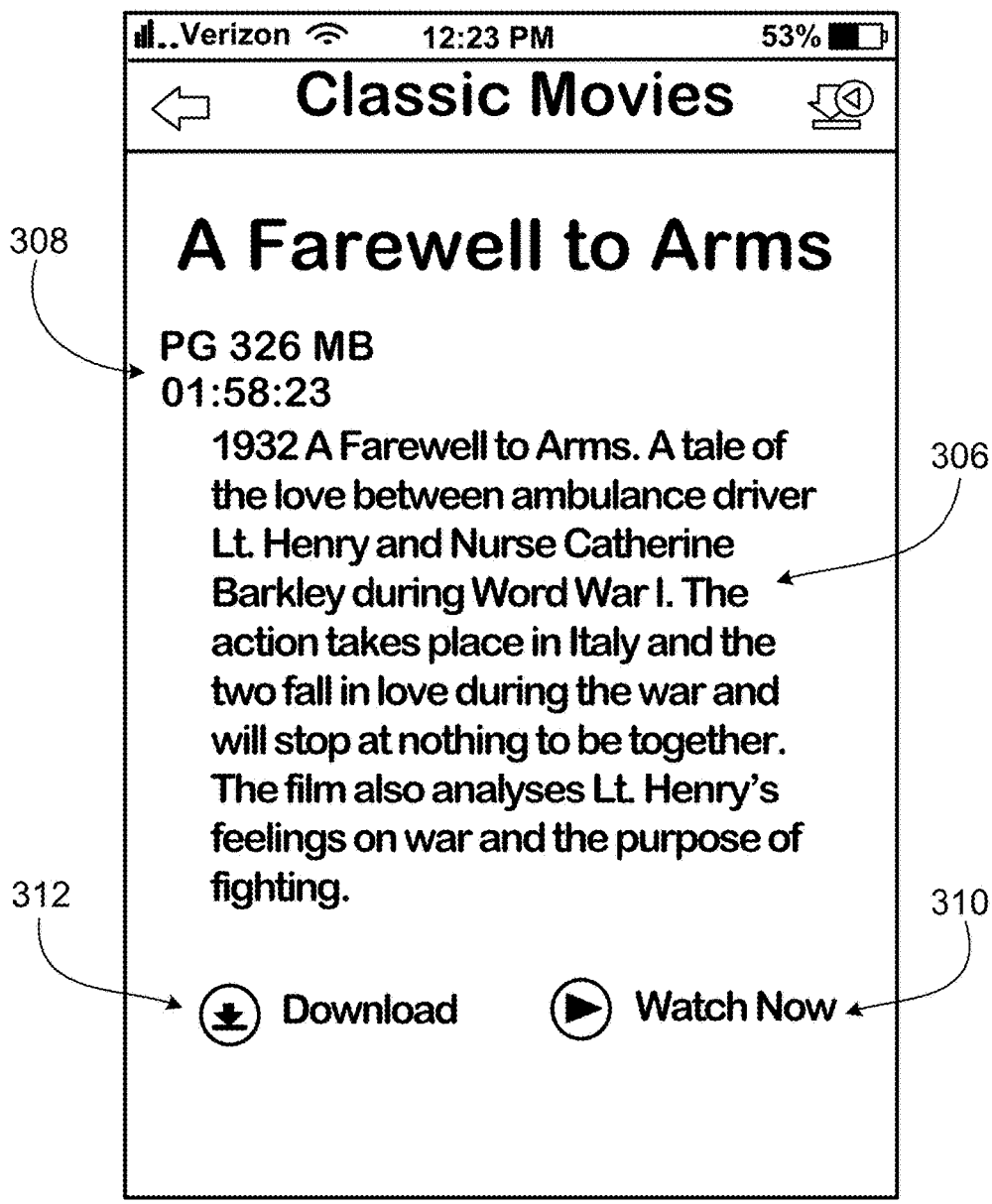

One of the benefits of online video ads, as opposed to a TV broadcast commercial, is interactivity. Online ads may encourage the user of the device to perform an action (e.g., tap on the screen, press a key, nod their head, or some other behavior), which triggers the app to offer more information about the advertiser. For example, FIG. 9 illustrates how a user may be encouraged to indicate their interest, and FIG. 10 shows the result—a web page for the advertiser which subsequently loads inside the device web browser. Typically the app suspends playout of the commercial while this action is performed, and playout resumes when the action is complete.

Interactive commercials 340 often contain metadata 342 that specifies the interactive element 344 (for example, using a <VideoClicks> tag in the VAST specification).

In order to perform the associated action, e.g. launch a web site or fetch data on a remote server, the app often needs network connectivity. In this case, the action will fail when the user has previously downloaded the commercial and is viewing it offline.

Here we introduce an implementation that supports interactive commercials during offline playout in a number of ways including one or more of the following and combinations of any two or more of them:

When downloading the commercial, the app also downloads all interactive instructions (in the case of a VAST-compliant system, this means downloading XML data nested within the <VideoClicks> element). If the user attempts to interact with the commercial while the device is offline, but the interactive element requires a network connection, the app records the user intent 346, and informs the user that the action will be performed when network connectivity is restored (See FIG. 13). If the user attempts again (a second or subsequent time) to trigger the interactive element while the device is offline, the app may ignore the request, or it may again inform the user that the action will be performed when network connectivity is restored.

Figure 14:
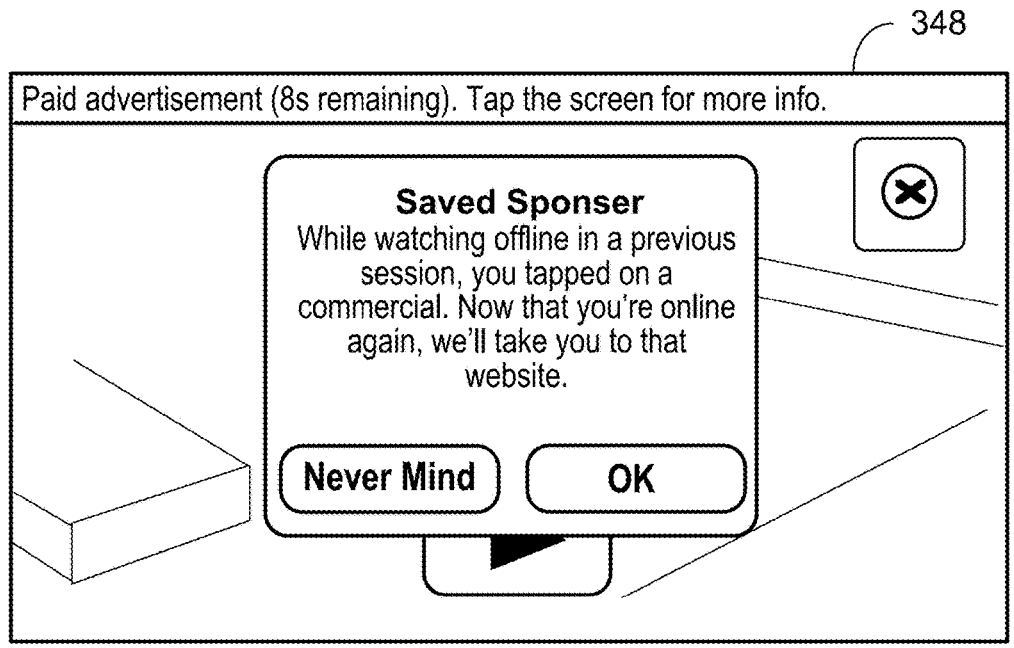
Figure 15:
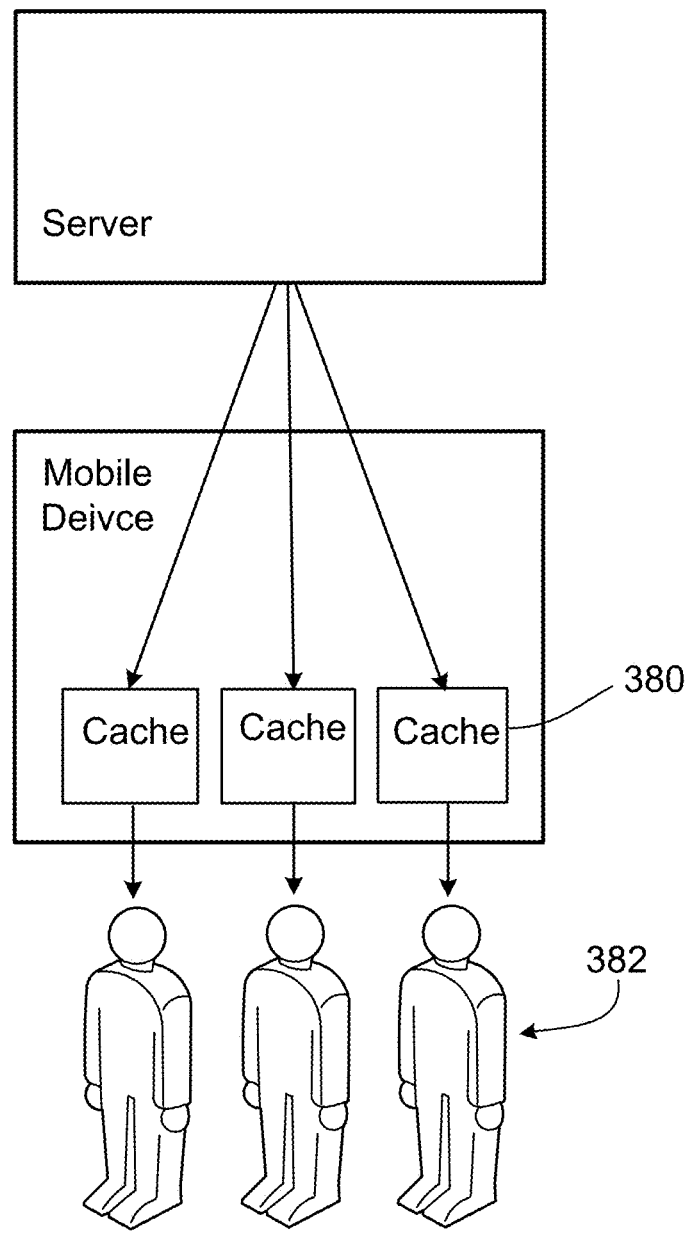

Having recorded the user intent to access the interactive content, the app may then begin monitoring for network connectivity. Alternatively, this check for connectivity may be performed by a separate application or process. The app may alert 348 the user (e.g., using a pop-up message on the home screen of the device) when network connectivity is restored, to inform the user that they can now perform the interactive action (e.g., launch the associated web page) corresponding to the commercial they saw previously (FIG. 14). In some cases, the app may perform this check at every app launch. In some cases, the app may perform this check at a fixed time interval. In some instances, the app may transmit to a server element the user intent, and the server can subsequently send an email to the user which includes the interactive element; the advantage of the latter approach is that the user can retain the email message and decide for themselves when to access the interactive content.

To support deferred interactivity, the app monitors and persistently records the user interactions with ads while offline.

The techniques described here can be implemented in digital electronic circuitry, or in hardware, firmware, software, or in combinations of them. The techniques can be implemented as a program product, i.e., a computer program tangibly embodied in an information carrier, e.g., in a machine-readable storage device or in a propagated signal, for execution by, or to control the operation of a processor, a computer, or multiple computers. A program can be written in any form of programming language, including compiled or interpreted languages, and it can be deployed in any form, including as a stand-alone program or as a module, component, subroutine, or other unit suitable for use in a computing or mobile environment. A program can be deployed to be executed on one computer or mobile device or on multiple computers or mobile devices at one site or distributed across multiple sites and interconnected by a communication network.

Activities that we describe can be performed by one or more programmable processors executing a program to perform functions by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the program and/or the processor/special circuitry that implements that functionality.

Processors suitable for the execution of a program include, by way of example, both general and special purpose microprocessors, and any one or more processors of any kind of digital computer or mobile device. Generally, a processor will receive instructions and data from a read-only memory or a random access memory or both. Generally, a computer or mobile device will also include, or be operatively coupled to receive data from or transfer data to, or both, one or more mass storage devices for storing data, e.g., magnetic, magneto-optical disks, or optical disks. Information carriers suitable for embodying program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the techniques that we describe can be implemented on a computer or mobile device having a display device, e.g., a CRT (cathode ray tube) or LCD (liquid crystal display) monitor, for displaying information to the user and a keyboard and a pointing device, e.g., a mouse or a trackball, or a touch surface, by which the user can provide input to the computer or mobile device (e.g., interact with a user interface element, for example, by clicking a button on such a pointing device or touching the touch surface). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques that we describe can be implemented in a distributed system that includes a back-end component, e.g., as a data server, and/or a middleware component, e.g., an application server, and/or a front-end component, e.g., a client computer or mobile device having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, cellular telephone networks, and Wi-Fi, and include both wired and wireless networks.

The computing system can include clients and servers. A client and server are generally remote from each other and typically interact over a communication network. The relationship of client and server arises by virtue of programs running on the respective computers or mobile devices and having a client-server relationship to each other.

Other implementations are within the scope of the following claims.

The invention claimed is:

1. A method comprising
at a mobile device downloading and storing a video that includes a point for a commercial at the beginning, during, or at the end of the video and downloading one or more promotions or public service announcements and metadata associated with each promotion or public service announcement, the metadata associated with at least one promotion or public service announcement comprising information representing a lack of one or more of (a) an expiry, (b) times when the promotion or public service announcement may be presented, or (c) restrictions on videos into which the promotion or public service announcement may be inserted, based on the metadata, the mobile device selecting one of the stored promotions or public-service announcements to be presented in the video at the point for the commercial.

2. The method of claim 1 comprising at a time when a mobile device would have performed a tracking beacon with respect to a presentation of the promotion or a public service announcement, the presentation having been made when the mobile device was offline:

an app recording on the mobile device one or more of the following: (A) a network address to which a communication would have been made to perform the tracking beacon, (B) a timestamp for the tracking beacon, and (C) an identification of the promotional or public service announcement.

3. The method of claim 2 comprising at a time when the mobile device is again online, sending a communication to the network address and performing the tracking beacon.

4. The method of claim 3 in which the time between when the communication is sent and the time when the tracking beacon would have been performed is at least one hour.

5. The method of claim 2 in which the timestamp represents a time when the tracking beacon would have been performed had the mobile device then been online.

6. The method of claim 3 in which performing the tracking beacon causes a server to record the presentation of the promotion or public service announcement.

7. The method of claim 2 in which the network address comprises URL.

8. The method of claim 2 in which the app records one or more of the location of the mobile device during presentation of the promotion or public service announcement and the duration of the promotion or public service announcement.

9. The method of claim 3 in which the communication to the network address is performed automatically when the mobile device is again online.

10. The method of claim 3 in which the communication is made to a proxy server operating on behalf of the server.

11. The method of claim 2 in which the app records on the mobile device one or more of the following: (A) a URL of a server to which a communication would have been made to perform the tracking beacon, (B) a timestamp for the tracking beacon, the time stamp representing a time when the tracking beacon would have been performed had the device then been online, and (C) an identification of the promotional commercial, (D) the location of the mobile device during presentation of the promotional commercial, and (E) the duration of the promotional.

12. The method of claim 1 comprising making at least one of the stored promotions or public service announcements accessible through an API to another application running on the mobile device.

13. The method of claim 12 in which the other application comprises a phone-dialing application that presents a stored promotion or public service announcement while the user is waiting for the call to go through.

14. The method of claim 12 in which the other application runs automatically when the mobile device is booted up, and the application presents a stored promotion or public service announcement during the booting up.

15. The method of claim 12 in which the other application comprises a game application, and the application presents a stored promotion or public service announcement before allowing the user to play the game.

16. The method of claim 12 in which the other application comprises a video-playing application that presents a list of videos for selection by the user, and the application presents a stored promotion or public service announcement at a time before, during, or after playing the video selected by the user.

17. The method of claim 1 comprising downloading more than one video and interleaving the downloading of at least two of the videos with the downloading of at least two of the promotions or public service announcements.

18. The method of claim 1 in which the downloading of the promotion or public service announcement comprises downloading a lower-quality version of a promotion or public service announcement and subsequently downloading a higher-quality version of the promotion or public service announcement.

19. The method of claim 1, wherein the video is downloaded over a WAN from a first server, and said promotions or public service announcements and metadata associated with each promotion or public service announcement are downloaded over a WAN from a second server, wherein said first server is distinct from said second server.

20. The method of claim 1, comprising:

in response to receiving a user input, determining whether a remote auxiliary content server is presently accessible by said wireless device over a WAN; and if said remote auxiliary content server is determined to be presently accessible by said wireless device over a WAN, downloading one or more auxiliary files from said remote auxiliary content server containing commercial content and storing said files in non-volatile memory of said device.

21. The method of claim 20, comprising:

if said remote auxiliary content server is determined not to be presently accessible, retrieving one or more of said stored promotions or public-service announcements for playback.

22. The method of claim 1, comprising playing back said selected stored promotion or public-service announcement in conjunction with playing back said video.

23. The method of claim 1, comprising causing the wireless device to request refreshed promotions or public service announcements from an auxiliary content server based on a predetermined schedule at times when said auxiliary content server is accessible by said wireless device over a WAN.

24. The method of claim 1, comprising causing the wireless device, in response to a user input, to request refreshed promotions or public service announcements from an auxiliary content server if said auxiliary content server is accessible by said wireless device over a WAN.

25. The method of claim 1, comprising determining whether a remote auxiliary content server is presently accessible by said wireless device over a WAN; and if said remote auxiliary content server is determined to be presently accessible by said wireless device over a WAN, downloading one or more auxiliary files from said remote auxiliary content server containing commercial content and storing said files in non-volatile memory of said device.

26. The method of claim 1, wherein said downloading one or more promotions or public service announcements and metadata associated with each promotion or public service announcement comprises causing said wireless device to receive a push notification from a server over a WAN.

27. The method of claim 1, wherein said downloading one or more promotions or public service announcements and metadata associated with each promotion or public service announcement comprises causing said wireless device to receive said promotions or public service announcements after the passage of a period of time determined from a prior receipt by said mobile device of promotions or public service announcements.

28. The method of claim 1 comprising, after playing back said selected one of the stored promotions or public service announcements, creating an impression record reflecting said playing back of said selected one of the stored promotions or public service announcements on said wireless device; and transmitting contents of said impression record to an impression record receiving server.

29. The method of claim 28, wherein said impression record contains timestamp information indicating a time that said selected one of the stored promotions or public service announcements was played back.

30. The method of claim 28, comprising storing said impression record in a non-volatile memory of said mobile device and, if said impression record receiving server is not accessible from said wireless device over a WAN, transmit said stored impression record to the impression record receiving server at a later time when said impression record receiving server is accessible from said wireless device over a WAN.

31. The method of claim 28, comprising transmitting said impression record to said impression record receiving server immediately after it is created if said impression record receiving server is accessible from said wireless device over a WAN at that time.

* * * * *

UNITED STATES PATENT AND TRADEMARK OFFICE
CERTIFICATE OF CORRECTION

PATENT NO. : 10,616,546 B2
APPLICATION NO. : 15/963954
DATED : April 7, 2020
INVENTOR(S) : Adam L. Berger, Joshua Pressnell and Richard David Jackson Page 1 of 1

It is certified that error appears in the above-identified patent and that said Letters Patent is hereby corrected as shown below:

On the Title Page

On page 2, Column 1, Line 8, item (63) please delete "and" and insert --application No. 14/243,937 is--, therefor.

In the Claims

On Column 23, Line 13, in Claim 1, delete "public-service" and insert --public service--, therefor.

On Column 23, Line 41, in Claim 7, before "URL." insert --a--.

On Column 24, Line 46, in Claim 21, delete "public-service" and insert --public service--, therefor.

On Column 24, Line 49, in Claim 22, delete "public-service" and insert --public service--, therefor.

On Column 23, Line 61, in Claim 11, delete "duration of the promotional." and insert --duration of the promotional commercial.--.

Signed and Sealed this
Seventeenth Day of November, 2020

Andrei Iancu
*Director of the United States Patent and Trademark Office*